(12) United States Patent
Mori

(10) Patent No.: US 8,351,135 B2
(45) Date of Patent: Jan. 8, 2013

(54) IMAGING LENS AND IMAGING APPARATUS

(75) Inventor: Masao Mori, Saitama (JP)

(73) Assignee: Fujifilm Corporation, Tokyo (JP)

( * ) Notice: Subject to any disclaimer, the term of this patent is extended or adjusted under 35 U.S.C. 154(b) by 80 days.

(21) Appl. No.: 12/907,637

(22) Filed: Oct. 19, 2010

(65) Prior Publication Data
US 2011/0090575 A1   Apr. 21, 2011

(30) Foreign Application Priority Data

Oct. 20, 2009  (JP) ................. P2009-241209
Mar. 10, 2010  (JP) ................. P2010-052885
Sep. 3, 2010   (JP) ................. P2010-197605

(51) Int. Cl.
*G02B 9/34*   (2006.01)
*G02B 3/02*   (2006.01)

(52) U.S. Cl. ..................... 359/771; 359/715

(58) Field of Classification Search ........... 359/715, 359/771, 772, 781
See application file for complete search history.

(56) References Cited

U.S. PATENT DOCUMENTS

| | | | |
|---|---|---|---|
| 5,039,212 A * | 8/1991 | Kanoshima | 359/679 |
| 7,009,784 B2 | 3/2006 | Amanai | |
| 7,295,386 B2 | 11/2007 | Taniyama | |

FOREIGN PATENT DOCUMENTS

| | | |
|---|---|---|
| JP | 2005-18041 A | 1/2005 |
| JP | 2005-181596 A | 7/2005 |
| JP | 2007-122007 A | 5/2007 |
| JP | 2007-133324 A | 5/2007 |
| JP | 2008-275783 A | 11/2008 |
| JP | 2009-53411 A | 3/2009 |

\* cited by examiner

*Primary Examiner* — William Choi
(74) *Attorney, Agent, or Firm* — Birch, Stewart, Kolasch & Birch, LLP

(57) ABSTRACT

An imaging lens includes: a first lens with a meniscus shape having a concave surface facing an object side; a second positive lens; a third negative lens with a meniscus shape having a convex surface facing an image side; and a fourth negative lens. The first to fourth lenses are arranged in this order from the object side. The imaging lens is configured such that a normal line of an object-side surface of the fourth lens at a point where the outermost light beam of an on-axis light flux passes intersects the optical axis on the image side of the object-side surface.

16 Claims, 18 Drawing Sheets

EXAMPLE 1

EXAMPLE 2

EXAMPLE 3

EXAMPLE 4

FIG. 7   EXAMPLE 5
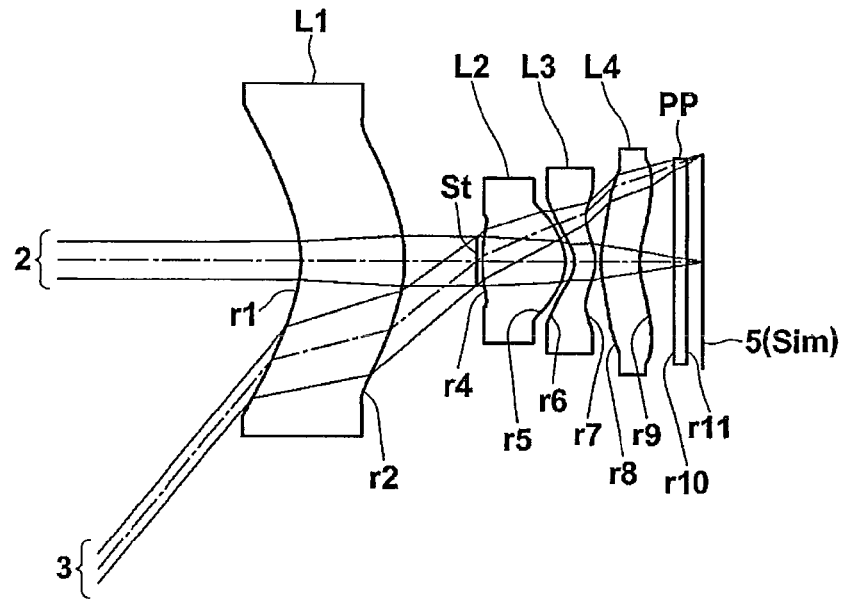
FIG. 8   EXAMPLE 6
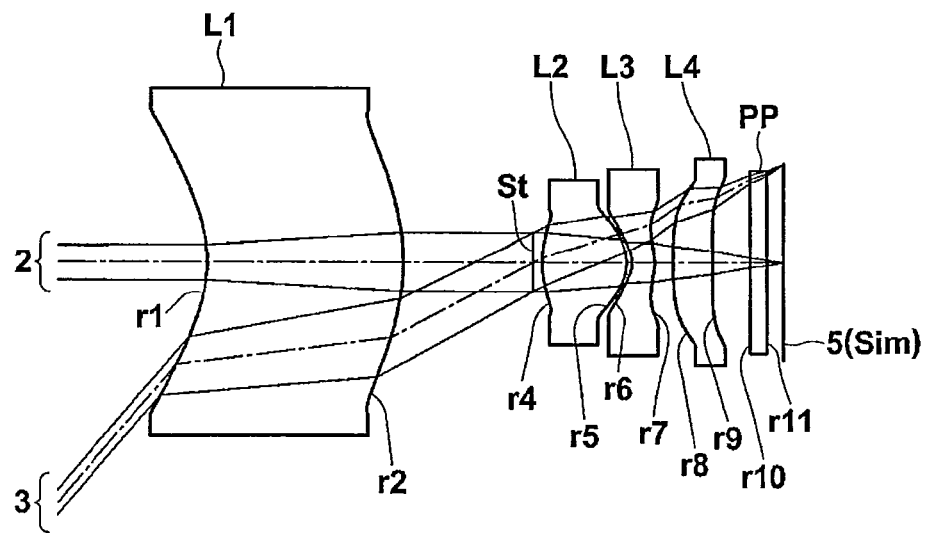

FIG. 9  EXAMPLE 7
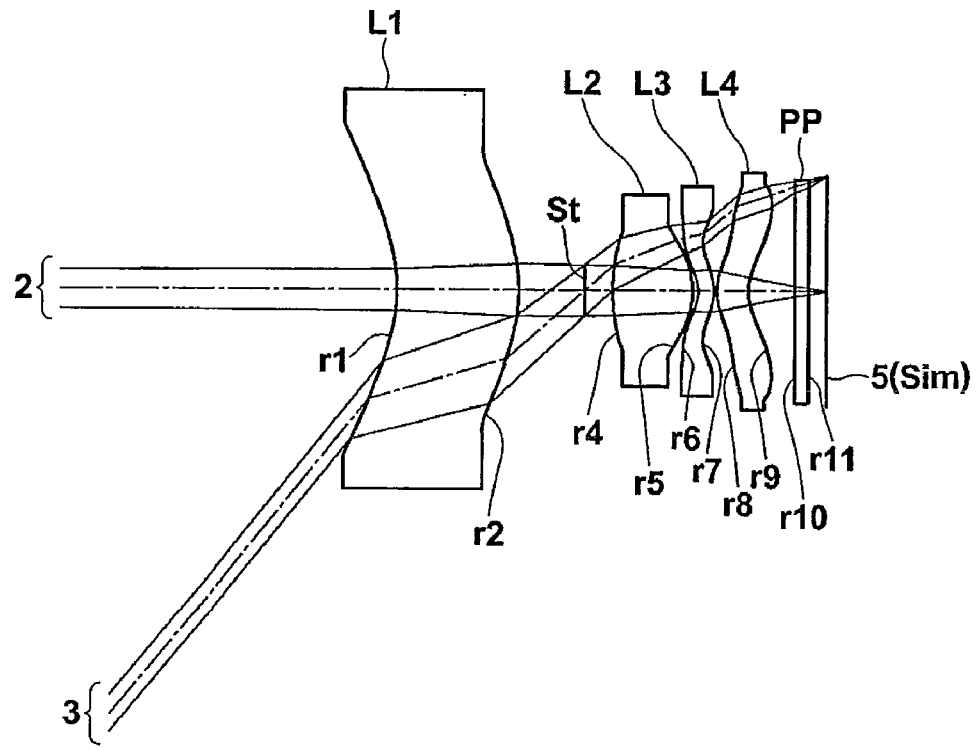
FIG. 10  EXAMPLE 8
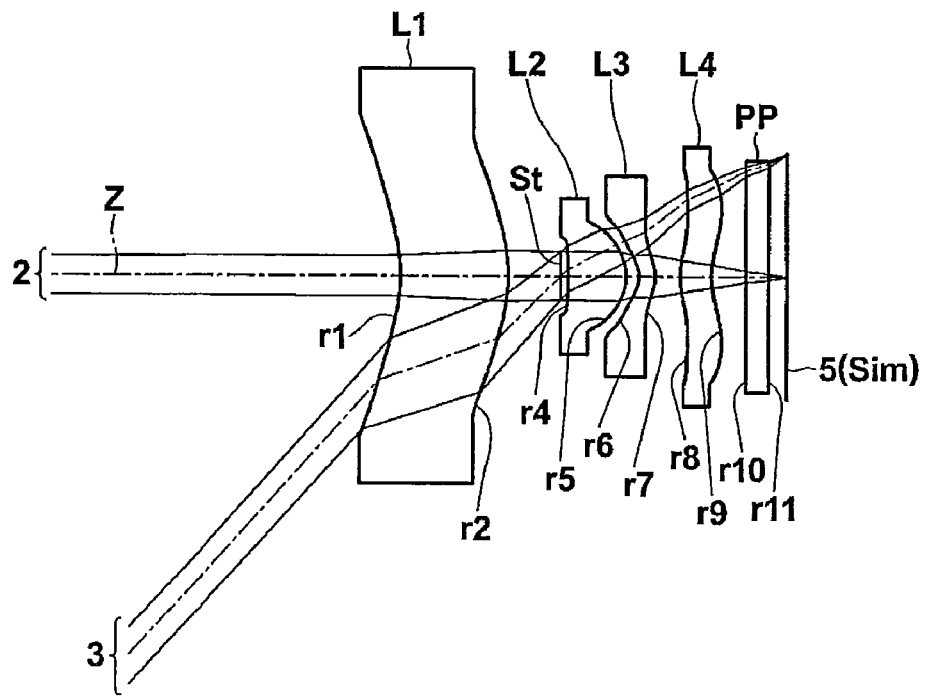

FIG. 11 EXAMPLE 9
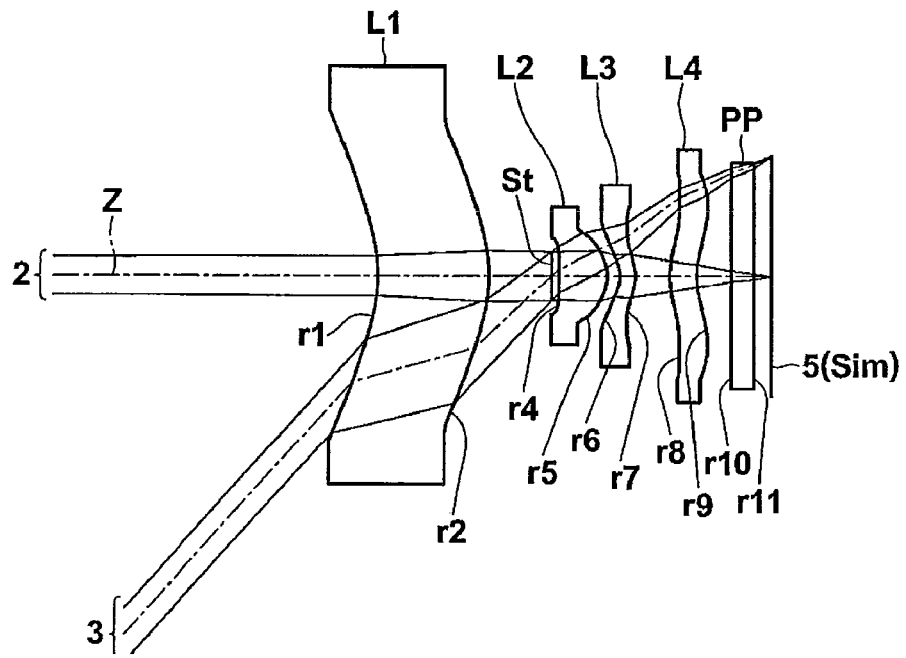
FIG. 12 EXAMPLE 10
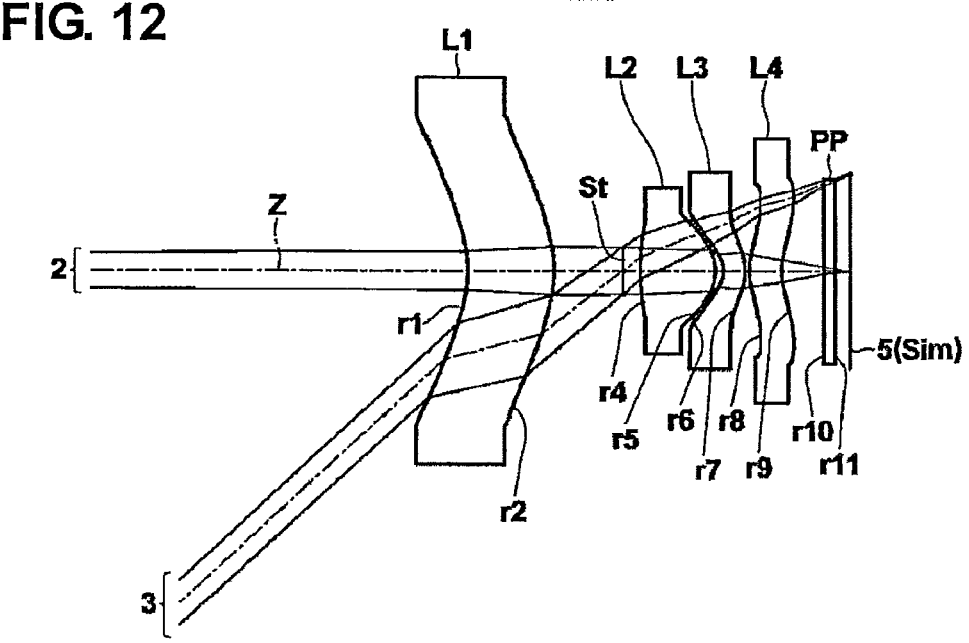

EXAMPLE 1

FIG. 13A — Fno. = 2.90, -0.05mm 0.05mm SPHERICAL ABERRATION (e-LINE, g-LINE, C-LINE)

FIG. 13B — ω = 49.8°, -0.05mm 0.05mm ASTIGMATISM (SAGITTAL, TANGENTIAL)

FIG. 13C — ω = 49.8°, -20% 20% DISTORTION

FIG. 13D — ω = 49.8°, -20 μm 20 μm LATERAL CHROMATIC ABERRATION

EXAMPLE 2
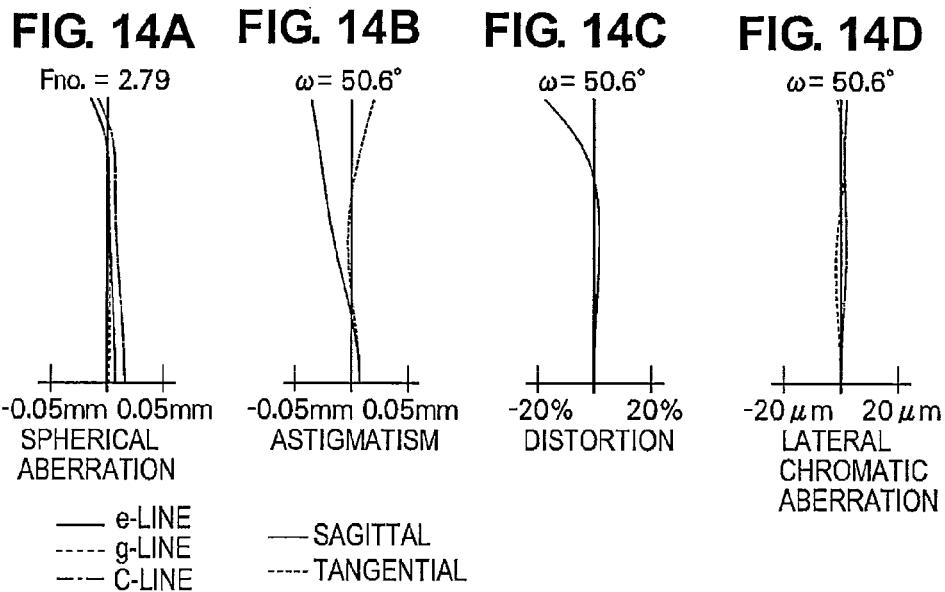
FIG. 14A Fno. = 2.79 −0.05mm 0.05mm SPHERICAL ABERRATION
— e-LINE
----- g-LINE
—·— C-LINE
FIG. 14B ω = 50.6° −0.05mm 0.05mm ASTIGMATISM
— SAGITTAL
----- TANGENTIAL
FIG. 14C ω = 50.6° −20% 20% DISTORTION
FIG. 14D ω = 50.6° −20μm 20μm LATERAL CHROMATIC ABERRATION
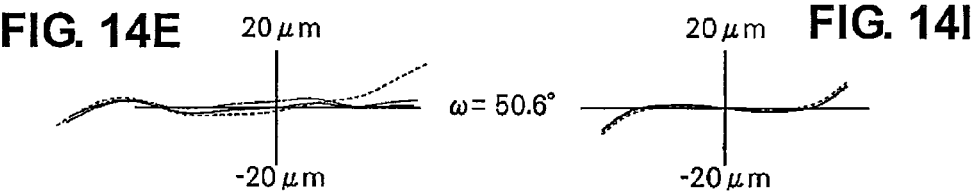
FIG. 14E  ω = 50.6°  FIG. 14I
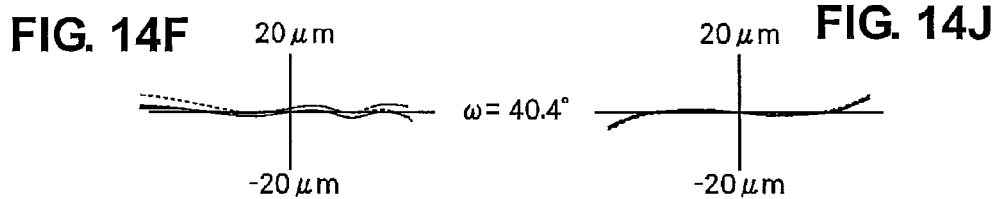
FIG. 14F  ω = 40.4°  FIG. 14J
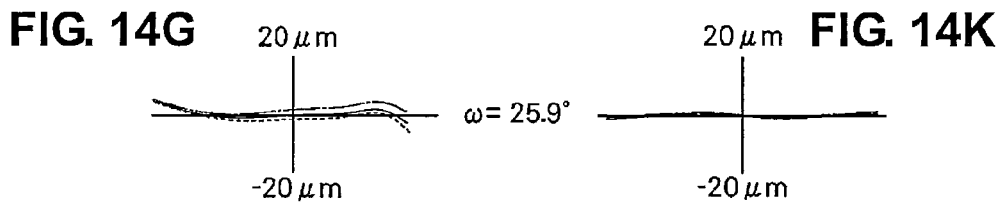
FIG. 14G  ω = 25.9°  FIG. 14K
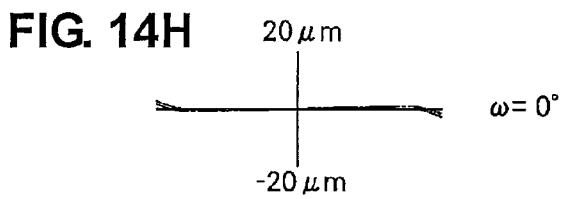
FIG. 14H  ω = 0°

EXAMPLE 3
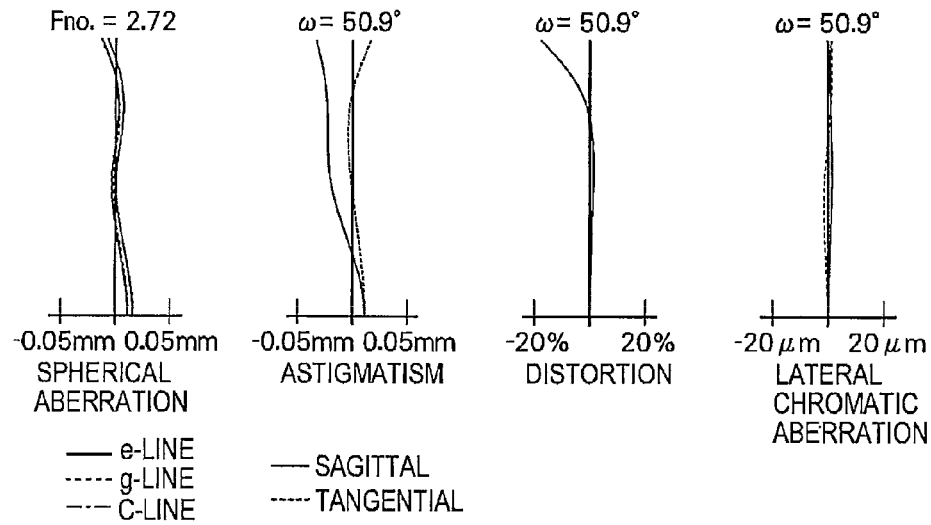
FIG. 15A — Fno. = 2.72, −0.05mm to 0.05mm, SPHERICAL ABERRATION
FIG. 15B — ω = 50.9°, −0.05mm to 0.05mm, ASTIGMATISM
FIG. 15C — ω = 50.9°, −20% to 20%, DISTORTION
FIG. 15D — ω = 50.9°, −20 μm to 20 μm, LATERAL CHROMATIC ABERRATION
— e-LINE
----- g-LINE
--- C-LINE
— SAGITTAL
----- TANGENTIAL
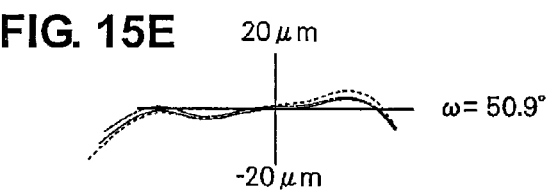
FIG. 15E, 20 μm / −20 μm, ω = 50.9°
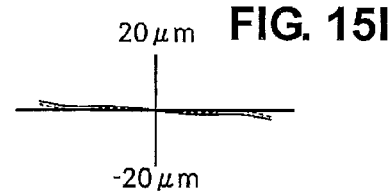
FIG. 15I, 20 μm / −20 μm
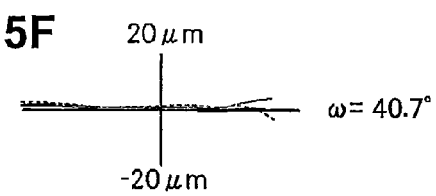
FIG. 15F, 20 μm / −20 μm, ω = 40.7°
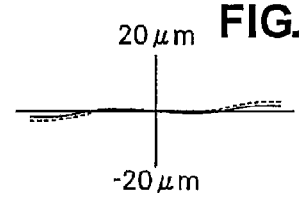
FIG. 15J, 20 μm / −20 μm
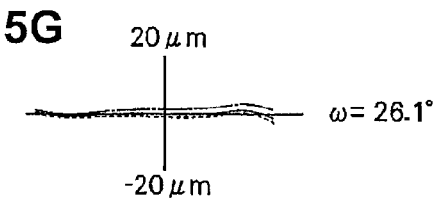
FIG. 15G, 20 μm / −20 μm, ω = 26.1°
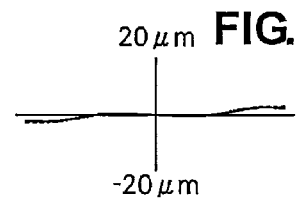
FIG. 15K, 20 μm / −20 μm
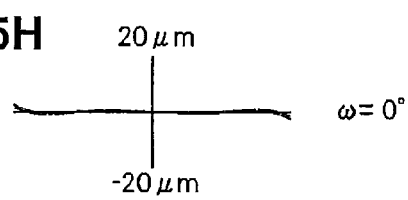
FIG. 15H, 20 μm / −20 μm, ω = 0°

EXAMPLE 4
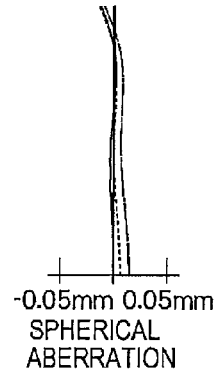
FIG. 16A
Fno. = 2.80
-0.05mm 0.05mm
SPHERICAL ABERRATION
— e-LINE
----- g-LINE
—-— C-LINE
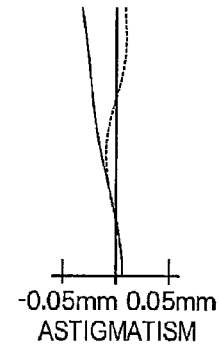
FIG. 16B
ω = 50.6°
-0.05mm 0.05mm
ASTIGMATISM
— SAGITTAL
----- TANGENTIAL
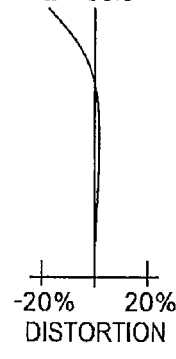
FIG. 16C
ω = 50.6°
-20% 20%
DISTORTION
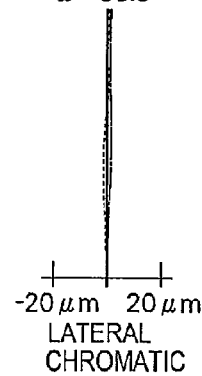
FIG. 16D
ω = 50.6°
-20μm 20μm
LATERAL CHROMATIC ABERRATION
FIG. 16E
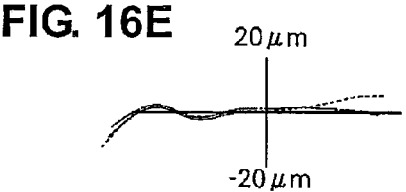
ω = 50.6°
FIG. 16I
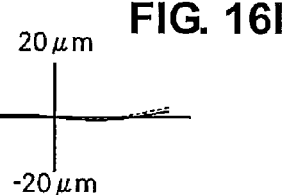
FIG. 16F
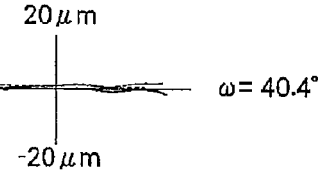
ω = 40.4°
FIG. 16J
FIG. 16G
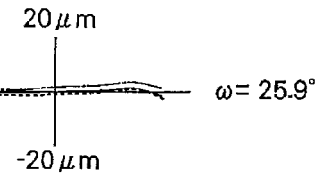
ω = 25.9°
FIG. 16K
FIG. 16H
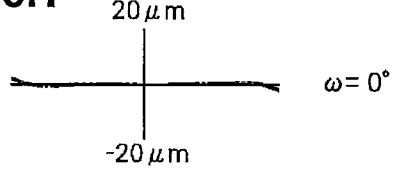
ω = 0°

EXAMPLE 5

Fno. = 2.80

-0.05mm  0.05mm
SPHERICAL
ABERRATION

—— e-LINE
----- g-LINE
--- C-LINE

ω = 50.6°

-0.05mm  0.05mm
ASTIGMATISM

—— SAGITTAL
----- TANGENTIAL

ω = 50.6°

-20%  20%
DISTORTION

ω = 50.6°

-20μm  20μm
LATERAL
CHROMATIC
ABERRATION

ω = 50.6°

ω = 40.4°

ω = 25.9°

ω = 0°

EXAMPLE 6

Fno. = 2.80
-0.05mm 0.05mm
SPHERICAL ABERRATION
— e-LINE
----- g-LINE
—‑— C-LINE

ω= 48.7°
-0.05mm 0.05mm
ASTIGMATISM
— SAGITTAL
----- TANGENTIAL

ω= 48.7°
-20% 20%
DISTORTION

ω= 48.7°
-20μm 20μm
LATERAL CHROMATIC ABERRATION
FIG. 18E 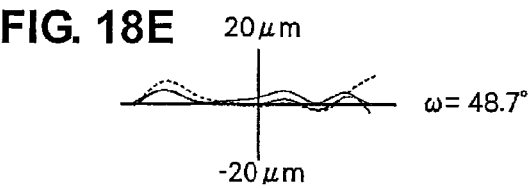 ω= 48.7° FIG. 18I 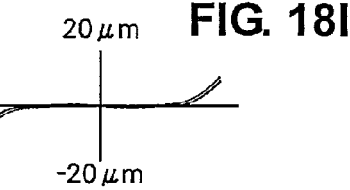
FIG. 18F 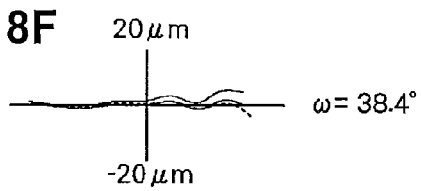 ω= 38.4° FIG. 18J 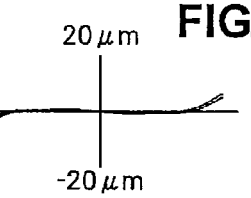
FIG. 18G 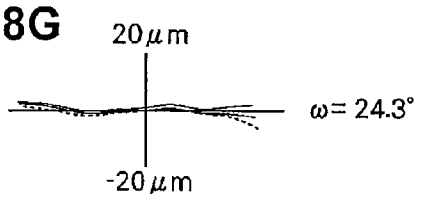 ω= 24.3° FIG. 18K 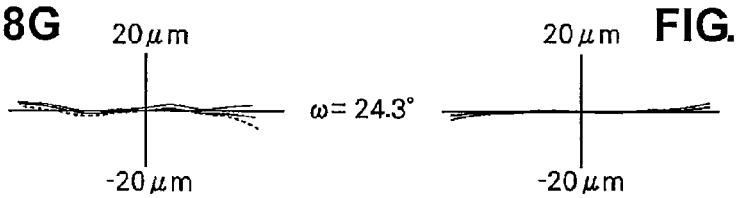
  ω= 0°

EXAMPLE 7
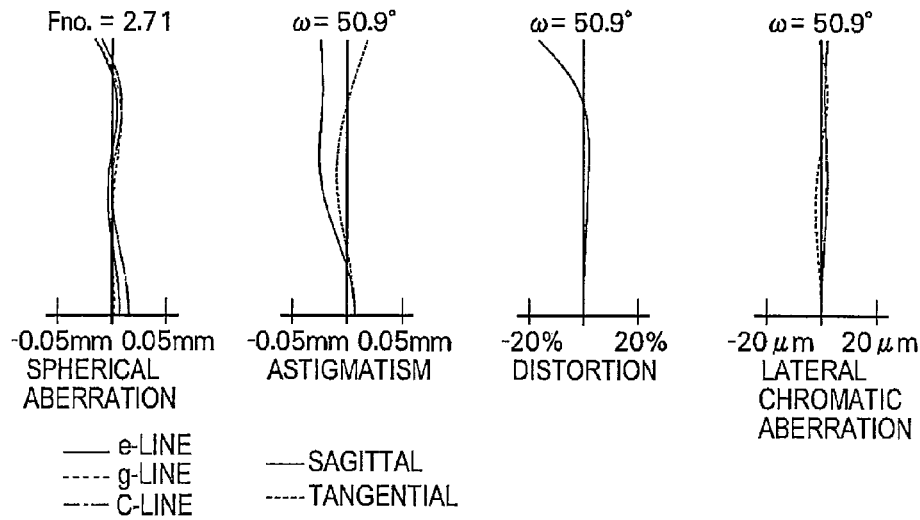
FIG. 19A Fno. = 2.71 −0.05mm 0.05mm SPHERICAL ABERRATION
FIG. 19B ω= 50.9° −0.05mm 0.05mm ASTIGMATISM
FIG. 19C ω= 50.9° −20% 20% DISTORTION
FIG. 19D ω= 50.9° −20μm 20μm LATERAL CHROMATIC ABERRATION
— e-LINE
---- g-LINE
—·— C-LINE
— SAGITTAL
----- TANGENTIAL
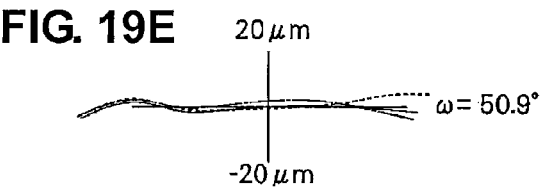
FIG. 19E  ω= 50.9°
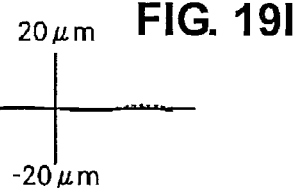
FIG. 19I
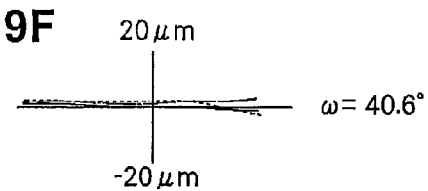
FIG. 19F  ω= 40.6°
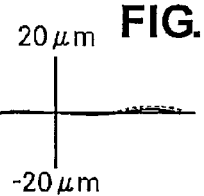
FIG. 19J
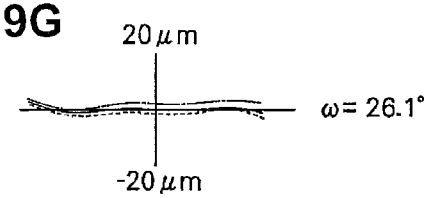
FIG. 19G  ω= 26.1°
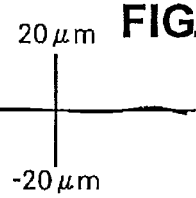
FIG. 19K
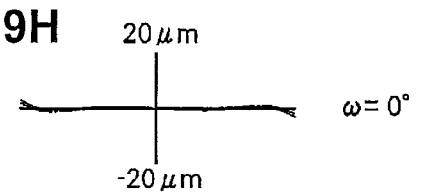
FIG. 19H  ω= 0°

EXAMPLE 8
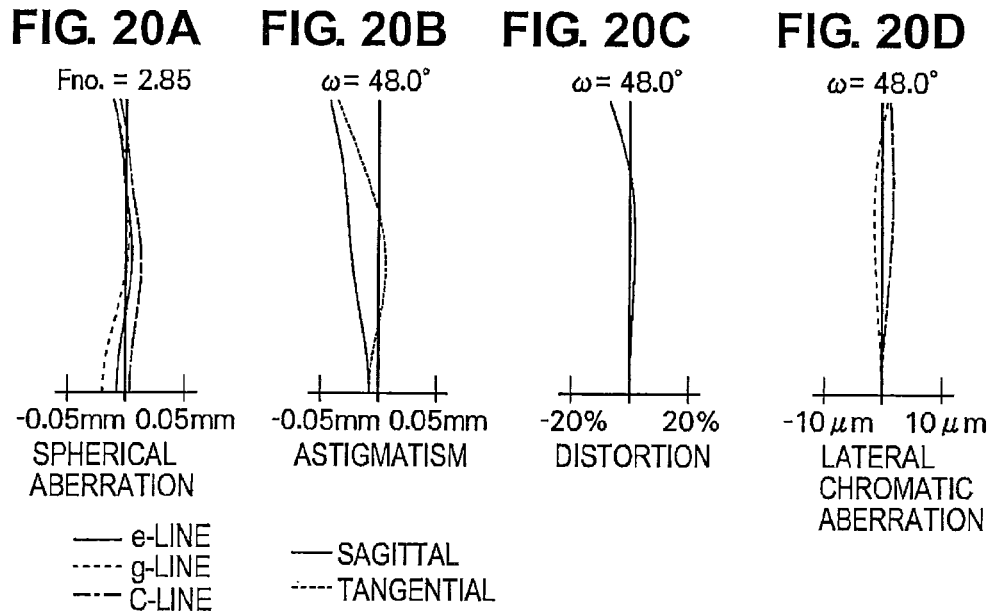
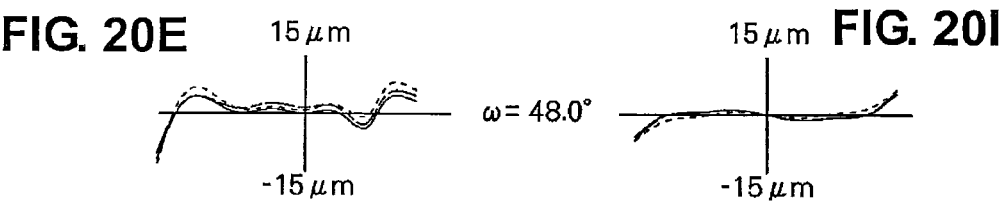
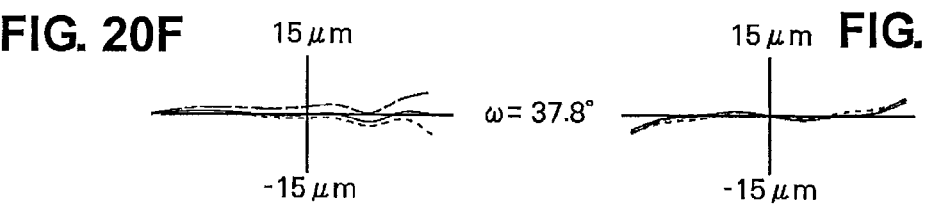
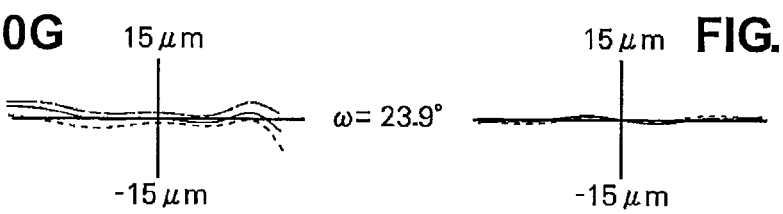
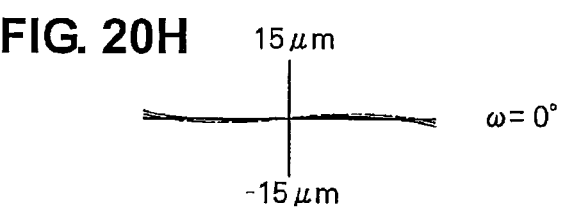

EXAMPLE 9
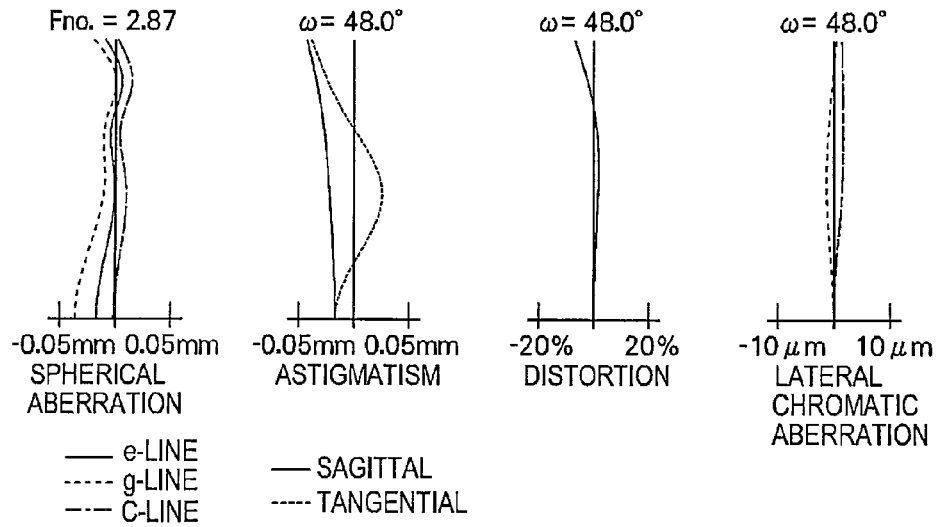
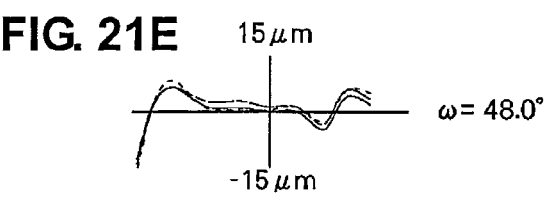 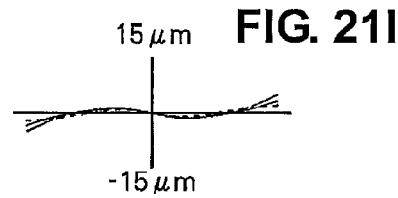
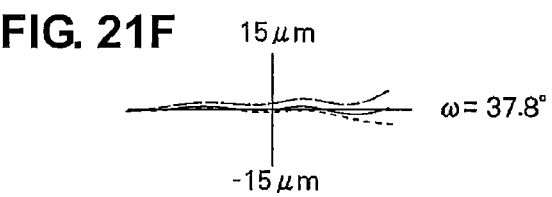 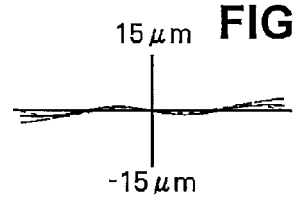
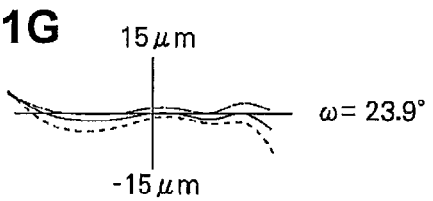 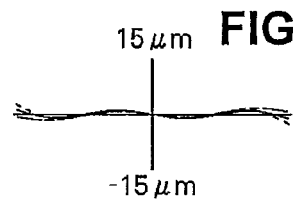
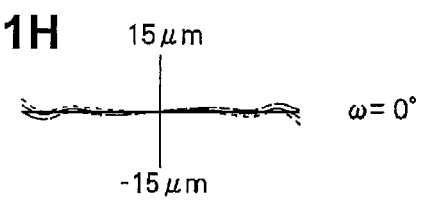

EXAMPLE 10
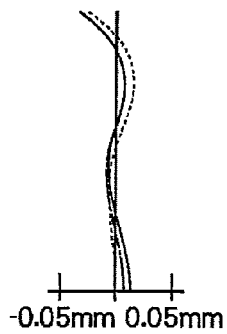
FIG. 22A
Fno. = 2.82
-0.05mm 0.05mm
SPHERICAL
ABERRATION
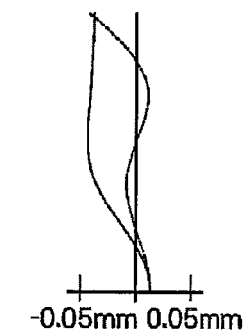
FIG. 22B
ω= 42.7°
-0.05mm 0.05mm
ASTIGMATISM
FIG. 22C
ω= 42.7°
-5%  5%
DISTORTION
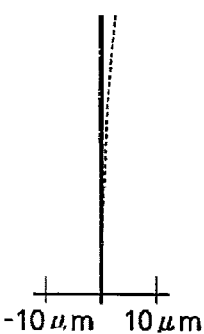
FIG. 22D
ω= 42.7°
-10μm  10μm
LATERAL
CHROMATIC
ABERRATION
—— e-LINE
---- g-LINE
—·— C-LINE
—— SAGITTAL
---- TANGENTIAL
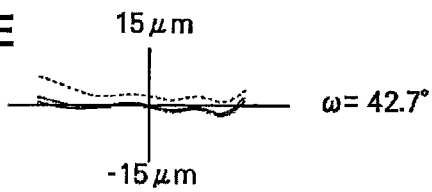
FIG. 22E  ω= 42.7°
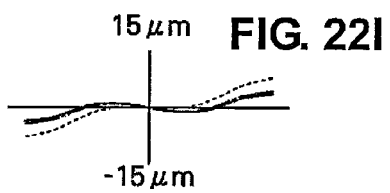
FIG. 22I
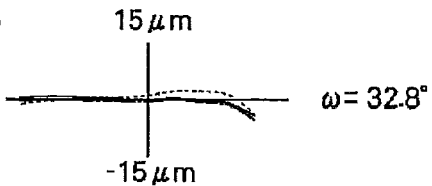
FIG. 22F  ω= 32.8°
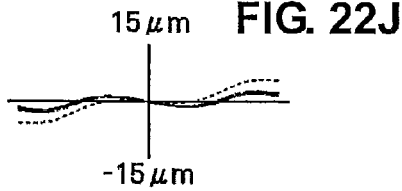
FIG. 22J
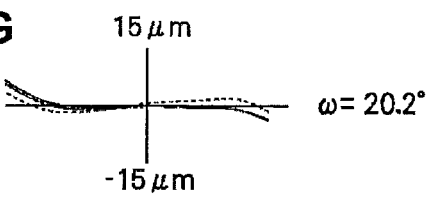
FIG. 22G  ω= 20.2°
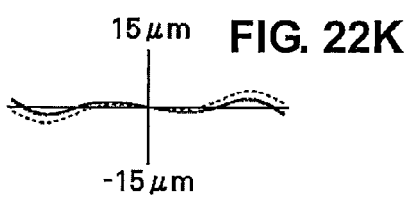
FIG. 22K
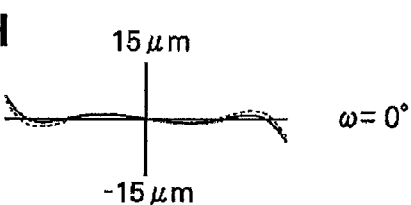
FIG. 22H  ω= 0°

IMAGING LENS AND IMAGING APPARATUS

CROSS-REFERENCE TO RELATED APPLICATIONS

This application is based upon and claims the benefit of priority from the Japanese Patent Application No. 2009-241209 filed on Oct. 20, 2009, No. 2010-052885 filed on Mar. 10, 2010, and No. 2010-197605 filed on September 3; the entire contents of which are incorporated herein by reference.

BACKGROUND OF THE INVENTION

1. Field of the Invention

The present invention relates to an imaging lens and an imaging apparatus, and more particularly, to an imaging lens suitable as a reading lens for reading a document image and an imaging apparatus including the imaging lens.

2. Description of the Related Art

Image reading apparatuses have been known which read a document image using a lens, form the document image on an imaging device, such as a CCD (Charge Coupled Device), and convert the image information into signals. The image reading apparatus needs to read the document image information fully. Therefore, the imaging lens used for reading the document image needs to effectively correct various aberrations such as field curvature and distortion. In recent years, with an increase in the density of the imaging device, there is a demand for an imaging lens with high resolution. In particular, when a color document image is read, it is preferable that images formed in red (R), green (G), and blue (B) wavelength bands be substantially aligned with each other on the imaging surface of the imaging device and the contrasts of the images be equal to each other. Specifically, it is possible to obtain a high-contrast image on the imaging surface in a wide wavelength range by reducing the deviation of spherical aberration, longitudinal chromatic aberration, or lateral chromatic aberration in each of the R, G, and B colors and aligning the imaging positions of the images in the range from the center to the periphery of the images (aligning the image surfaces).

A line sensor has generally been used as the imaging device of the image reading apparatus. In general, there are a number of methods by which a line sensor scans and reads the document image. It is necessary to increase the resolution of the imaging device in order to read a document image with high resolution and it is easy for a line sensor with high selectivity to the size of the imaging element to respond to increasing resolution.

An image reading apparatus has been proposed which uses an area sensor instead of the line sensor. In recent years, the definition of an imaging device in the area sensor has increased and an image sensor with a pixel pitch of about 1 μm has been developed. For example, sensors with a small size of ⅓ inch and 500 megapixels to 800 megapixels are on the market. The use of the high-definition sensor makes it possible to read a document image with high resolution, similar to the line sensor with a wide reading width. In addition, the use of the area sensor makes it possible to read the document image all at once without scanning the document image. Therefore, it is possible to omit a scanning mechanism and allow a reduction in the size of the apparatus.

Since there is a strong demand for an image reading apparatus with a small size, it is preferable to reduce the size of the imaging lens. JP-A-2008-275783 and JP-A-2009-53411 disclose an image reading lens with four lenses and an image reading lens with three lenses which can be used for the above-mentioned image reading apparatus. JP-A-2005-18041 and JP-A-2007-122007 disclose an imaging lens with four lenses. JP-A-2005-181596 and JP-A-2007-133324 disclose an imaging lens with three lenses.

As described above, it is preferable that the imaging lens for an image reading apparatus effectively correct various aberrations and have a high optical performance capable of responding to a high-definition imaging device with a large number of pixels. In order to reduce the size of the image reading apparatus, it is necessary to reduce the focal length of the imaging lens, thereby decreasing a conjugate length (substantially, the distance from the document image to the imaging surface of the imaging device), as well as reducing the size of the imaging lens.

When the line sensor is used in the image reading apparatus, it is possible to obtain high resolution. However, in this case, since the size of the imaging device increases, it is difficult to reduce the imaging magnification of the optical system (it is difficult to increase a reduction ratio). Therefore, it is difficult to reduce the focal length of the imaging lens. When the conjugate length is reduced in this kind of apparatus, an increase in the angle of view of the optical system is noticeable. Therefore, in the imaging lens according to the related art, various aberrations are insufficiently corrected and it is difficult to read the document image with high resolution.

When the area sensor is used in the image reading apparatus, the imaging magnification is reduced (the reduction ratio increases) and it is possible to reduce the focal length. Therefore, it is relatively easy to reduce the conjugate length and it is possible to reduce the size of the apparatus. However, when a large document image is read all at once by the area sensor, the diagonal of the document image is an imaging range. Therefore, when the angle of view of the imaging lens is insufficiently wide, the conjugate length increases, which makes it difficult to reduce the size of the apparatus.

The lens systems disclosed in JP-A-2008-275783 and JP-A-2009-53411 have a large F-number of 5.2 to 6 and it is difficult for the lens system to sufficiently respond to high-definition pixels. In addition, these lens systems are not miniaturized. Therefore, when the lens system is provided in the imaging apparatus, a large imaging device is required and it is difficult to reduce the size of the apparatus. The lens systems disclosed in JP-A-2005-18041 and JP-A-2007-122007 are manufactured for portable terminals. Therefore, the lens systems have a small size and a sufficiently small F-number of 2.4 to 3.0 and can respond to high resolution. However, the lens systems have a total angle of view of about 75° at most. Therefore, when a large document image is read all at once by the area sensor, the angle of view is insufficiently wide and it is difficult to reduce the size of the apparatus. The lens systems disclosed in JP-A-2005-181596 and JP-A-2007-133324 have a small size and an angle of view wider than the lens systems disclosed in JP-A-2005-18041 and JP-A-2007-122007. However, the lens system is insufficient to correct chromatic aberration and it is difficult for the lens system to obtain high resolution.

SUMMARY OF THE INVENTION

The invention has been made in order to solve the above-mentioned problems and an object of the invention is to provide an imaging lens having a small F-number, high resolution, a sufficiently wide angle of view, and a small size and an imaging apparatus including the imaging lens.

A first imaging lens of the invention includes: a first lens with a meniscus shape having a concave surface facing an object side; a second positive lens; a third negative lens with a meniscus shape having a convex surface facing an image side; and a fourth negative lens. The first to fourth lenses are arranged in this order from the object side. A normal line of an object-side surface of the fourth lens at a point where the outermost light beam of an on-axis light flux passes intersects the optical axis on the image side of the object-side surface.

In the first imaging lens, a normal line of an object-side surface of the second lens at a point where the outermost light beam of the on-axis light flux passes may intersect the optical axis at a position that is closer to the object side than the object-side surface.

The first imaging lens of the invention may satisfy the following Conditional expression 1:

$$0.25 < D/f < 4.0 \qquad \text{[Conditional expression 1]}$$

(where D indicates a distance between the first lens and the second lens on the optical axis and f indicates the focal length of the entire system).

A second imaging lens of the invention includes a first lens group and a second lens group arranged in this order from an object side. The first lens group includes a first lens with a meniscus shape having a concave surface facing the object side. The second lens group has two or more lenses, each having at least one aspheric surface, including a second positive lens that is arranged closest to the object side and a negative lens that is arranged closest to an image side. The second imaging lens satisfies the following Conditional expression 1:

$$0.25 < D/f < 4.0 \qquad \text{[Conditional expression 1]}$$

(where D indicates a distance between the first lens and the second lens on the optical axis and f indicates the focal length of the entire system).

In the second imaging lens, the second lens group may include a second positive lens, a third negative lens with a meniscus shape having a convex surface facing the image side, and a fourth negative lens which are arranged in this order from the object side.

In the first and second imaging lenses of the invention and an example of the structure of the second lens group of the second imaging lens of the invention, the term "meniscus shape having the concave surface facing the object side" related to the first lens, the term "positive" related to the second lens, the term "negative meniscus shape having the convex surface facing the image side" related to the third lens, the term "negative" related to the fourth lens, and the term "negative" related to the lens which is arranged closest to the image side in the second lens group are with respect to the paraxial region.

The first and second imaging lenses according to the invention may satisfy the following Conditional expressions 2 to 5. It is preferable that the first and second imaging lenses according to the invention satisfy any one or any combination of the following Conditional expressions 2 to 5:

$$0.5 < d1/D < 4.0 \qquad \text{[Conditional expression 2]}$$

$$\alpha > 50° \qquad \text{[Conditional expression 3]}$$

$$0.8 < \alpha/\beta < 3.0 \qquad \text{[Conditional expression 4]}$$

$$0.0 \leq |Z4|/|Z5| < 0.5 \qquad \text{[Conditional expression 5]}$$

(where d1 indicates the thickness of the center of the first lens, D indicates the distance between the first lens and the second lens on the optical axis, α indicates the angle between a principal ray of a light flux that is incident on an object-side surface of the first lens at a maximum angle of view and a normal line of the object-side surface of the first lens at a point where the principal ray passes, β indicates the angle between a principal ray of a light flux that is emitted from an image-side surface of the first lens at a maximum angle of view and a normal line of the image-side surface of the first lens at a point where the principal ray passes, Z4 indicates the distance between a point on an object-side surface of the second lens where the outermost light beam of a light flux at a maximum angle of view passes and a tangent plane to the top of the object-side surface of the second lens in the optical axis direction, and Z5 indicates the distance between a point on an image-side surface of the second lens where the outermost light beam of a light flux at a maximum angle of view passes and a tangent plane to the top of the image-side surface of the second lens in the optical axis direction).

The terms "incidence" and "emission" related to α and β are for the traveling direction of the light beam from the object side to the image side.

In the first and second imaging lenses of the invention, the second lens may have a biconvex shape in the paraxial region. In the first and second imaging lenses of the invention, the second lens may have a shape in which a normal line of an object-side surface of the second lens at a point where the outermost light beam of an on-axis light flux passes intersects the optical axis at a position that is closer to the object side than the object-side surface.

When the second lens group of the second imaging lens according to the invention includes the second lens, the third lens, and the fourth lens having the above-mentioned structure, the first and second imaging lenses according to the invention may satisfy the following Conditional expression 6:

$$\nu 3 < 35 \qquad \text{[Conditional expression 6]}$$

(where ν3 indicates the Abbe number of the third lens with respect to the d-line).

When the second lens group of the second imaging lens according to the invention includes the second lens, the third lens, and the fourth lens having the above-mentioned structure, in the first and second imaging lenses according to the invention, an image-side surface of the third lens may be an aspheric surface. A normal line of the image-side surface of the third lens at a point where the outermost light beam of the on-axis light flux passes may intersect the optical axis at a first point that is closer to the object side than the image-side surface. A normal line of the image-side surface of the third lens at a point where the outermost light beam of a light flux at half the maximum angle of view passes may intersect the optical axis at a second point that is closer to the object side than the first point, be parallel to the optical axis, or intersect the optical axis at a third point that is closer to the image side than the image-side surface of the third lens. When the normal line of the image-side surface of the third lens at the point where the outermost light beam of the light flux at half the maximum angle of view passes intersects the optical axis at the second point, a normal line of the image-side surface of the third lens at a point where the outermost light beam of the light flux at the maximum angle of view passes may intersect the optical axis at a position that is closer to the object side than the second point, be parallel to the optical axis, or intersect the optical axis at a position that is closer to the image side than the image-side surface of the third lens. When the normal line of the image-side surface of the third lens at the point where the outermost light beam of the light flux at half the maximum angle of view passes is parallel to the optical axis or intersects the optical axis at the third point, the normal line of the image-side surface of the third lens at the point where the outermost light beam of the light flux at the maximum angle of view passes may intersect the optical axis at a position that is closer to the image side than the image-side surface. The imaging lens may satisfy the following Conditional expression 7:

$$-0.25 < Z7m/f < -0.03 \qquad \text{[Conditional expression 7]}$$

(where $Z7m$ indicates the longest distance between each point on the image-side aspheric surface of the third lens and a tangent plane to the top of the image-side surface of the third lens in the optical axis direction (for the sign of $Z7m$, the distance from the tangent plane to the top of the image-side surface of the third lens to the object side is negative and the distance from the tangent plane to the image side is positive) and f indicates the focal length of the entire system).

The term "outermost light beam" is with respect to the image-side surface of the third lens.

The term "light flux at half the maximum angle of view" means a light flux incident at half the maximum angle of view. In addition, the term "each point on the aspheric surface" related to $Z7m$ means each point in the range from the optical axis to a point where the outermost light beam of the light flux at the maximum angle of view in the image-side surface of the third lens, that is, each point in the effective diameter.

When the second lens group of the second imaging lens according to the invention includes the second lens, the third lens, and the fourth lens having the above-mentioned structure, in the first and second imaging lenses according to the invention, a normal line of an object-side surface of the fourth lens at a point where a principal ray of the light flux at the maximum angle of view passes may intersect the optical axis at a position that is closer to the image side than the object-side surface. The imaging lens may satisfy the following Conditional expression 8:

$$0° < \gamma < 35° \qquad \text{[Conditional expression 8]}$$

(where $\gamma$ indicates the angle between the optical axis and the normal line of the object-side surface of the fourth lens at the point where the principal ray of the light flux at the maximum angle of view passes).

It is considered that $\gamma$ is in the range of $-90° \leq \gamma \leq 90°$. The sign of $\gamma$ is positive when a normal line of the object-side surface of the fourth lens at a point where the principal ray of the light flux at the maximum angle of view passes intersects the optical axis at a position closer to the image side than the object-side surface, and the sign of $\gamma$ is negative when the normal line intersects the optical axis at a position closer to the object side than the object-side surface.

In the first and second imaging lenses according to the invention, at least one lens may be made of a glass material.

In the first and second imaging lenses according to the invention, the object side-surface of the fourth lens may be a convex surface. The term "object side-surface of the fourth lens being a convex surface" is with respect to the paraxial region.

The first and second imaging lenses according to the invention may further include an aperture diaphragm that is provided between the first lens and the second lens.

The first and second imaging lenses according to the invention may satisfy the following Conditional expression 9:

$$0.0 \leq d3/f < 0.5 \qquad \text{[Conditional expression 9]}$$

(where d3 indicates the distance between the aperture diaphragm and the second lens on the optical axis and f indicates the focal length of the entire system).

In the first and second imaging lenses according to the invention, the first lens may have at least one aspheric surface and be made of a polyolefin-based plastic material.

In the invention, the "on-axis light flux", the "light flux at half the maximum angle of view", and the "light flux at the maximum angle of view" are applied when light flux is incident up to the maximum diameter based on the specifications. In addition, in the invention, the "outermost light beam of the light flux" in a given surface means a light beam that intersects the surface at a position that is furthest away from the optical axis in a direction vertical to the optical axis, among the light beams of the light flux.

The maximum angle of view may be determined on the basis of the dimensions of the imaging surface of the imaging device provided on the image surface of the imaging lens. Specifically, for example, when the imaging surface has a rectangular shape, the length of the diagonal of the imaging surface is 2Y, the maximum image height is Y, and the focal length of the entire system is f, the maximum angle of view $\theta$ may be represented by the following relational expression:

$$\tan \theta = Y/f$$

However, when there is a non-negligible amount of distortion, it is preferable to use an image height considering the distortion.

An imaging apparatus of the invention includes the imaging lens according to the invention.

According to the first imaging lens of the invention, in the lens system including at least four lenses, the shape or power of each lens is appropriately set. In particular, the shape of the object side-surface of the fourth lens is appropriately set. Therefore, it is possible to provide an imaging lens that has a small F-number, high resolution, and a sufficiently wide angle of view and is capable of responding to a high-definition imaging device with a large number of pixels and reducing the size of an apparatus in addition to reducing the size of a lens system.

According to the second imaging lens of the invention, the shape of the lens in the first lens group and the arrangement of the power of the second lens group are appropriately set, and the second lens group includes two or more aspheric lenses and is configured so as to satisfy Conditional expression 1. Therefore, it is possible to provide an imaging lens that has a small F-number, high resolution, and a sufficiently wide angle of view and is capable of responding to a high-definition imaging device with a large number of pixels and reducing the size of an apparatus in addition to reducing the size of a lens system.

The imaging apparatus of the invention includes the imaging lens according to the invention. Therefore, it is possible to provide an imaging apparatus that has a small size and is capable of capturing an image at a wide angle of view, being provided with a high-definition imaging device with a large number of pixels, and obtaining a high-resolution image.

BRIEF DESCRIPTION OF THE DRAWINGS

FIG. 7 is a cross-sectional view illustrating an optical path and the structure of an imaging lens according to Example 5 of the invention;

FIG. 8 is a cross-sectional view illustrating an optical path and the structure of an imaging lens according to Example 6 of the invention;

FIG. 9 is a cross-sectional view illustrating an optical path and the structure of an imaging lens according to Example 7 of the invention;

FIG. 10 is a cross-sectional view illustrating an optical path and the structure of an imaging lens according to Example 8 of the invention;

FIG. 11 is a cross-sectional view illustrating an optical path and the structure of an imaging lens according to Example 9 of the invention;

FIG. 12 is a cross-sectional view illustrating an optical path and the structure of an imaging lens according to Example 10 of the invention;

FIGS. 13A to 13K are diagrams illustrating the aberrations of the imaging lens according to Example 1 of the invention;

FIGS. 14A to 14K are diagrams illustrating the aberrations of the imaging lens according to Example 2 of the invention;

FIGS. 15A to 15K are diagrams illustrating the aberrations of the imaging lens according to Example 3 of the invention;

FIGS. 16A to 16K are diagrams illustrating the aberrations of the imaging lens according to Example 4 of the invention;

FIGS. 18A to 18K are diagrams illustrating the aberrations of the imaging lens according to Example 6 of the invention;

FIGS. 19A to 19K are diagrams illustrating the aberrations of the imaging lens according to Example 7 of the invention;

FIGS. 20A to 20K are diagrams illustrating the aberrations of the imaging lens according to Example 8 of the invention;

FIGS. 21A to 21K are diagrams illustrating the aberrations of the imaging lens according to Example 9 of the invention;

FIGS. 22A to 22K are diagrams illustrating the aberrations of the imaging lens according to Example 10 of the invention;

DESCRIPTION OF THE PREFERRED EMBODIMENTS

Figure 1A:
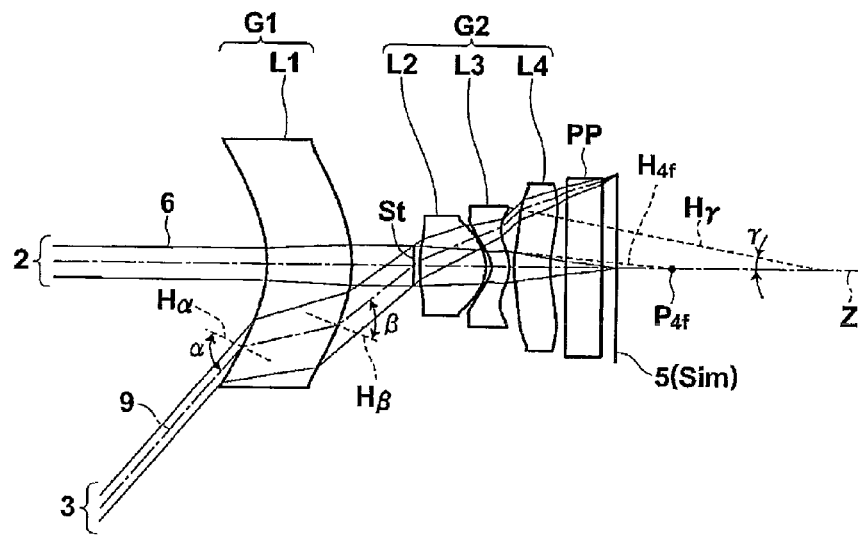
FIG. 1A is a cross-sectional view illustrating an optical path and the structure of an imaging lens according to an embodiment of the invention.
Figure 1B:
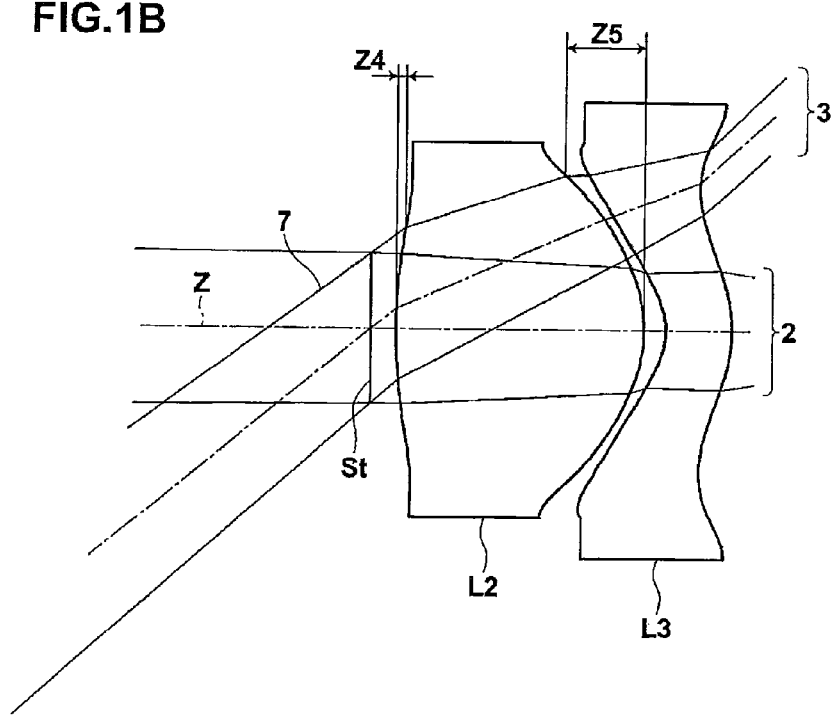
FIG. 1B is a partial enlarged view illustrating Conditional expression 5.
Figure 1C:
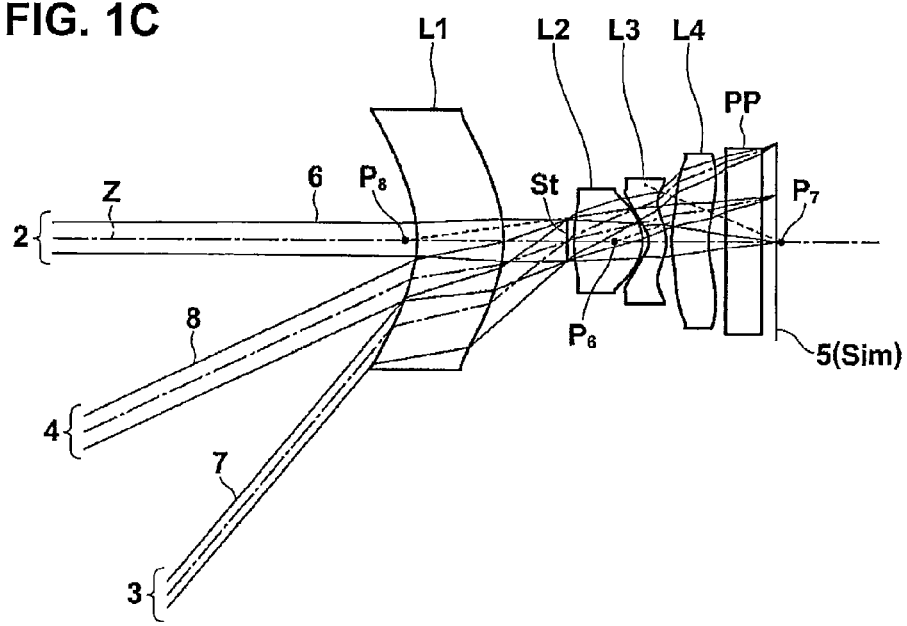
FIG. 1C is a cross-sectional view illustrating the aspheric shape of a third lens.
Figure 1D:
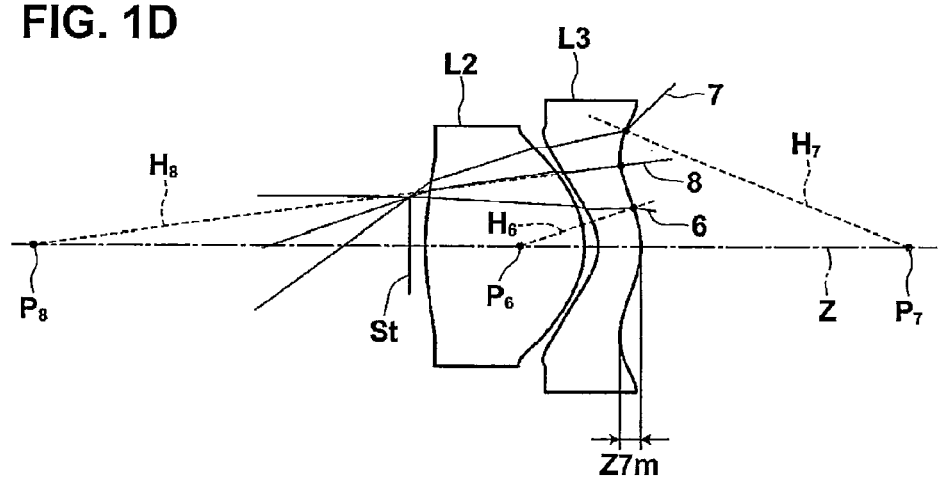
FIG. 1D is a partial enlarged view illustrating the aspheric shape of the third lens and Conditional expression 7.

Hereinafter, exemplary embodiments of the invention will be described in detail with reference to the accompanying drawings. First, an imaging lens according to a first embodiment of the invention will be described with reference to FIGS. 1A to 1D. FIG. 1A is a cross-sectional view illustrating the structure of the imaging lens according to the first embodiment of the invention and an optical path, and the imaging lens corresponds to an imaging lens according to Example 1, which will be described below. In FIG. 1A, the left side is an object side and the right side is an image side. FIG. 1A also shows an on-axis light flux 2 from an object at a predetermined finite distance and a light flux 3 at a maximum angle of view. The structural example shown in FIG. 1A includes the structure of an imaging lens according to a second embodiment of the invention, which will be described below. In FIG. 1A, reference numerals G1 and G2 will be described in the second embodiment. FIGS. 1B and 1D are partial enlarged views illustrating the imaging lens shown in FIG. 1A. FIG. 1C shows a light flux 4 at half the maximum angle of view in addition to the imaging lens and the optical path shown in FIG. 1A.

FIG. 1A also shows an imaging device 5 that is provided on an image surface Sim of the imaging lens, considering the case in which the imaging lens is applied to an imaging apparatus. When the imaging lens is applied to an imaging apparatus, it is preferable to provide, for example, a cover glass, a low pass filter, or an infrared cut filter according to the structure of a camera provided with the lens. FIG. 1A shows an example in which a parallel-plate-shaped optical member PP is arranged between a lens that is arranged closest to the image side and the imaging device 5 (image surface Sim), considering the above-mentioned case.

As shown in FIG. 1A, the imaging lens according to the first embodiment of the invention includes a first lens L1 with a meniscus shape having a concave surface facing the object side, a second positive lens L2, a third negative lens L3 with a meniscus shape having a convex surface facing the image side, and a fourth negative lens L4 which are arranged in this order from the object side along the optical axis Z. In order to reduce the size of the imaging lens, it is preferable to form the imaging lens with a small number of lenses. It is preferable that the number of lenses be 4 as in the example shown in FIG. 1A. The imaging lens shown in FIG. 1A further includes an aperture diaphragm St provided between the first lens L1 and the second lens L2. FIG. 1A does not necessarily show the shape or size of the aperture diaphragm St, but shows the position of the aperture diaphragm St on the optical axis Z.

When the object-side surface of the first lens L1 has a concave shape, it is possible to increase the angle between each light beam included in a light flux passing through a peripheral portion of the object-side surface and the normal line of the object-side surface of the first lens L1 at the position where each light beam passes through the object-side surface. Therefore, it is possible to obtain a wide angle of view. When the first lens L1 has a meniscus shape, it is possible to cancel a positive field curvature occurring in the object-side concave surface with an image-side convex surface. As such, the first lens L1 has a shape suitable for obtaining a wide angle of view and correcting the image surface. When the angle of view increases, the object-side concave surface of the first lens L1 has strong power. When the first lens L1 has a meniscus shape and the image-side surface of the first lens L1 is formed in a convex shape and has strong power, it is possible to cancel a large positive field curvature occurring in the object-side concave surface having strong power with the image-side convex surface having strong power.

Since the second positive lens L2 is arranged on the image side of the first lens L1, it is possible to refract an off-axis light flux incident at a wide angle of view to the optical axis and thus reduce the size of the imaging lens.

Since the third lens L3 is a negative meniscus lens having a convex surface facing the image side, it is easy to effectively correct various aberrations including spherical aberration while maintaining a balance with the second positive lens L2 and it is possible to obtain a small F-number and high resolution.

As shown in FIG. 1A, the imaging lens according to the first embodiment is configured such that a normal line $H_{4f}$ of the object side-surface of the fourth lens L4 at a point where the outermost light beam 6 of the on-axis light flux 2 passes intersects the optical axis Z on the image side of the object side-surface. In FIG. 1A, the normal line $H_{4f}$ is represented by a dotted line and an intersection point $P_{4f}$ between the normal line $H_{4f}$ and the optical axis Z is arranged closer to the image side than the object side-surface of the fourth lens L4.

The on-axis light flux emitted from an object on the optical axis passes through the first lens L1, the second lens L2, and the third lens L3 and is then incident on the fourth lens L4 as focused light. Since the fourth lens L4 is configured such that the normal line $H_{4f}$ of the object-side surface of the fourth lens L4 at the point where the outermost light beam 6 of the on-axis light flux 2 passes intersects the optical axis Z on the image side of the object-side surface, it is possible to reduce the angle between a focused light beam, which is incident on the object-side surface of the fourth lens L4, among the light beams passing through a region with a large pupil diameter in the on-axis light flux 2 and each normal line of the object-side surface of the fourth lens L4 at each point where each focused light beam passes. Therefore, it is possible to focus the light beams while finely adjusting the light beams, without greatly changing the spherical aberration that is corrected with a good balance by the strong positive power of the second lens L2 and the strong negative power of the third lens L3. In addition, since the fourth lens L4 is a negative lens, it is possible to slightly diffuse the light flux emitted from the image-side surface of the fourth lens L4 and correct spherical aberration to the over side. Therefore, it is easy to increase the distance (a so-called back focal length) from a lens surface closest to the image side in the entire system to the image surface Sim, as compared to the structure in which the fourth lens L4 is a positive lens.

It is preferable that the object-side surface of the fourth lens L4 have a convex shape in the paraxial region. According to this structure, in the paraxial region, it is possible to reduce the angle between a focused light beam incident on the object-side surface of the fourth lens L4 and each normal line of the object-side surface of the fourth lens L4 at each point where each focused light beam passes. Therefore, it is possible to focus the light beams while finely adjusting the light beams, without greatly changing the spherical aberration that is corrected with a good balance by the strong positive power of the second lens L2 and the strong negative power of the third lens L3.

It is preferable that the fourth lens L4 have a meniscus shape in a region in which the on-axis light flux passes. It is preferable that the fourth lens L4 have a meniscus shape having a convex surface facing the object side in the paraxial region. However, the invention is not limited thereto. The fourth lens L4 may have a meniscus shape having a convex surface facing the image side in the paraxial region and have a meniscus shape having a convex surface facing the object side in the region in which the outermost light beam of the on-axis light flux passes. When the fourth lens L4 has the above-mentioned meniscus shape, it is possible to effectively correct various aberrations while finely adjusting the aberrations, without making the fourth lens L4 have strong power.

That is, for the image-side surface of the fourth lens L4, it is preferable that the fourth lens L4 be configured such that the normal line (not shown) of the image-side surface of the fourth lens L4 at a point where the outermost light beam 6 of the on-axis light flux 2 passes intersects the optical axis Z on the image side of the image-side surface. According to this structure, it is possible to obtain the same effect as that obtained in the structure in which the normal line $H_{4f}$ of the object-side surface of the fourth lens L4 intersects the optical axis Z on the image side of the object-side surface.

It is preferable that the imaging lens according to the first embodiment of the invention have the following structures. As a preferred aspect, the imaging lens may have any one of the following structures or a combination of a plurality of structures.

When the distance between the first lens L1 and the second lens L2 on the optical axis is D and the focal length of the entire system is f, it is preferable that the imaging lens according to this embodiment satisfy the following Conditional expression 1:

$$0.25 < D/f < 4.0 \quad \text{[Conditional expression 1]}$$

If the ratio is less than the lower limit of Conditional expression 1, the distance between the first lens L1 and the second lens L2 is reduced, which is advantageous in reducing the size of the lens. However, the angle between the off-axis light flux incident on the second lens L2 and the optical axis Z increases. Therefore, when it is considered that the second lens L2 to the fourth lens L4 form one lens group, it is necessary to form a wide-angle lens in the lens group. As a result, it is difficult to correct lateral chromatic aberration, comatic aberration, or distortion. If the ratio is more than the upper limit of Conditional expression 1, the distance between the first lens L1 and the second lens L2 increases, which results in an increase in the size of the lens system. In addition, if the ratio is more than the upper limit of Conditional expression 1, it is possible to reduce the angle between the off-axis light flux incident on the second lens L2 and the optical axis Z and thus effectively correct the aberration of the lens group including the second lens L2 to the fourth lens L4. However, the absolute value of the curvature radius of the image-side convex surface of the first lens L1 is large and the image-side convex surface has weak power. Therefore, it is difficult to correct the field curvature occurring in the object-side concave surface with strong power in the first lens L1.

In order to reduce the size of the lens system, it is preferable that the imaging lens satisfy the following Conditional expression 1-1:

$$0.25 < D/f < 2.5 \quad \text{[Conditional expression 1-1]}$$

In order to reduce the size of the lens system, obtain a wide angle of view, and effectively correct lateral chromatic aberration, comatic aberration, and distortion, it is preferable that the imaging lens satisfy the following Conditional expression 1-2:

$$0.5 < D/f < 1.5 \quad \text{[Conditional expression 1-2]}$$

When the thickness of the center of the first lens L1 is d1 and the distance between the first lens L1 and the second lens L2 on the optical axis is D, it is preferable that the imaging lens satisfy the following Conditional expression 2:

$$0.5 < d1/D < 4.0 \quad \text{[Conditional expression 2]}$$

Conditional expression 2 relates to a reduction in the size of the lens system and the correction of aberration. If the ratio is less than the lower limit of Conditional expression 2, the distance between the first lens L1 and the second lens L2 increases. When the angle between a marginal light flux incident on the second lens L2 and the optical axis Z is small, the absolute value of the curvature radius of the image-side convex surface of the first lens L1 increases. Therefore, it is difficult to correct field curvature. If the ratio is more than the upper limit of Conditional expression 2, the size of the lens increases when the thickness of the center of the first lens L1 is large, or the angle between a marginal light flux incident on the second lens L2 and the optical axis Z increases when the distance between the first lens L1 and the second lens L2 is short. Therefore, it is difficult to correct various aberrations.

It is preferable that the imaging lens satisfy the following Conditional expression 2-1:

$$0.5 < d1/D < 3.0 \quad \text{[Conditional expression 2-1]}$$

When the upper limit of Conditional expression 2-1 is satisfied, it is possible to further reduce the size of the lens system and prevent a reduction in workability due to an excessively large thickness of the first lens L1.

In order to further reduce the size of the lens system and improve the workability of the first lens L1, it is preferable that the imaging lens satisfy the following Conditional expression 2-2:

$$0.5 < d1/D < 2.0 \quad \text{[Conditional expression 2-2]}$$

As shown in FIG. 1A, when the angle between a principal ray 9 of a light flux 3 that is incident on the object-side surface of the first lens L1 at a maximum angle of view and a normal line $H_\alpha$ (represented by a dotted line) of the object-side surface of the first lens L1 at a point where the principal ray 9 passes through the object-side surface is α, it is preferable that the imaging lens satisfy the following Conditional expression 3:

$$\alpha > 50° \quad \text{[Conditional expression 3]}$$

Conditional expression 3 is for obtaining a wide angle of view and reducing the size of an apparatus. If the angle is less than the lower limit of Conditional expression 3, it is difficult to sufficiently increase the angle of view of the lens system. Therefore, as described in "the means for solving the problem", when the imaging lens is provided in an image reading apparatus, it is difficult to reduce the size of the image reading apparatus.

When the angle α increases gradually, the angle between a light beam and the normal lines of a plurality of surfaces at points where the light beam passes through the surfaces increases. Therefore, it is difficult to correct high-order comatic aberration. For this reason, it is more preferable that the angle α satisfy the following Conditional expression 3-1:

$$50° < \alpha < 85° \quad \text{[Conditional expression 3-1]}$$

As shown in FIG. 1A, when the angle between the principal ray 9 of the light flux 3 that is incident on the object-side surface of the first lens L1 at the maximum angle of view and the normal line $H_\alpha$ (represented by a dotted line) of the object-side surface of the first lens L1 at the point where the principal ray 9 passes through the object-side surface is α and the angle between the principal ray 9 of the light flux 3 that is emitted from an image-side surface of the first lens L1 at the maximum angle of view and a normal line $H_\beta$ (represented by a dotted line) of the image-side surface of the first lens L1 at a point where the principal ray 9 passes through the image-side surface is β, it is preferable that the imaging lens satisfy the following Conditional expression 4:

$$0.8 < \alpha/\beta < 3.0 \quad \text{[Conditional expression 4]}$$

Conditional expression 4 regulates the meniscus shape of the first lens L1 and is mainly for effectively correcting field curvature while achieving a wide angle of view. If the ratio is less than the lower limit of Conditional expression 4, it is possible to obtain a wide angle of view. However, since the angle between the normal line of each surface at the point where a light beam passes and the light beam is large, high-order comatic aberration occurs due to the marginal light flux which makes it difficult to obtain high resolution. If the ratio is more than the upper limit of Conditional expression 4, the absolute value of the curvature radius of the image-side convex surface of the first lens L1 increases. As a result, field curvature is insufficiently corrected.

In order to further improve the effects of Conditional expression 4, it is preferable that the imaging lens satisfy the following Conditional expression 4-1:

$$1.0 < \alpha/\beta < 2.0 \quad \text{[Conditional expression 4-1]}$$

The second lens L2 of the imaging lens may have a biconvex shape as in the example shown in FIG. 1A. When the second lens L2 is a biconvex lens, it is easy to ensure a strong positive power and it is possible to reduce the focal length and the size of the imaging lens. This effect can be expected when the second lens L2 has a biconvex shape in a paraxial region. When the second lens L2 has a biconvex shape in the entire region from the paraxial region to a region in which the light flux 3 passes at the maximum angle of view, it is possible to focus all light beams contributing to the formation of an image. Therefore, it is possible to further reduce the size of the imaging lens.

Figure 2:
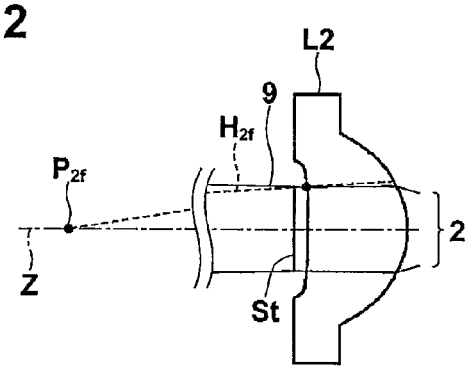
FIG. 2 is a partial enlarged view illustrating the surface shape of a second lens of an imaging lens according to another embodiment of the invention.
Figure 3:
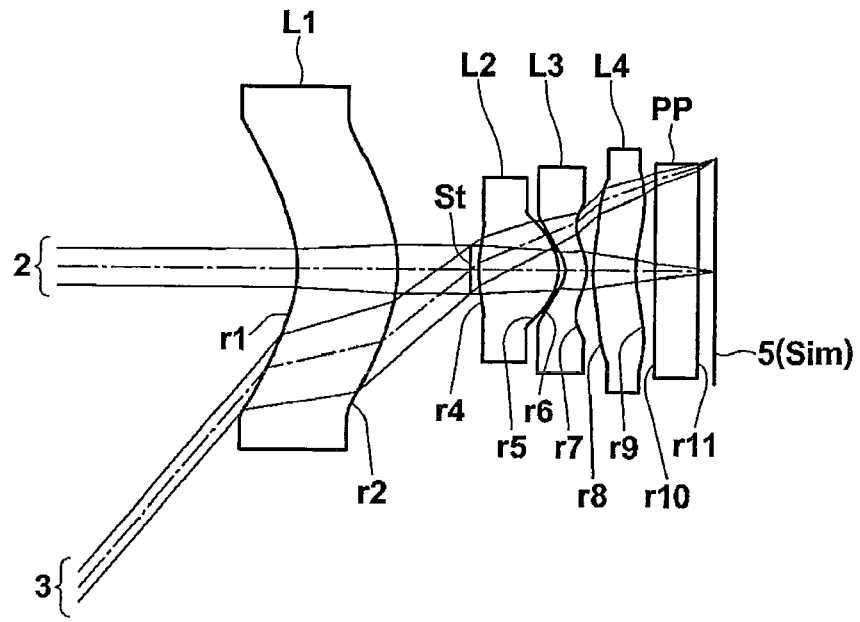
FIG. 3 is a cross-sectional view illustrating an optical path and the structure of an imaging lens according to Example 1 of the invention.
Figure 4:
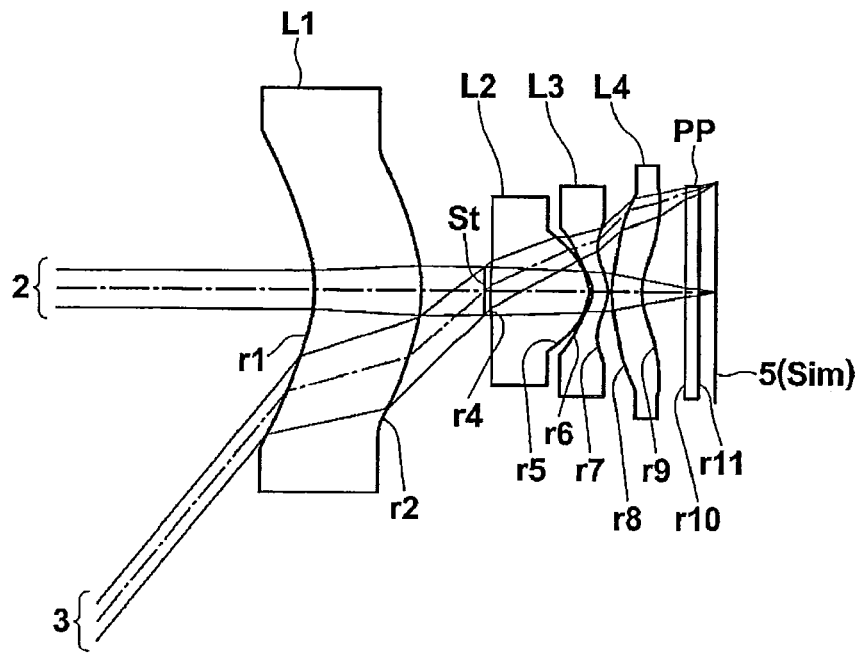
FIG. 4 is a cross-sectional view illustrating an optical path and the structure of an imaging lens according to Example 2 of the invention.
Figure 5:
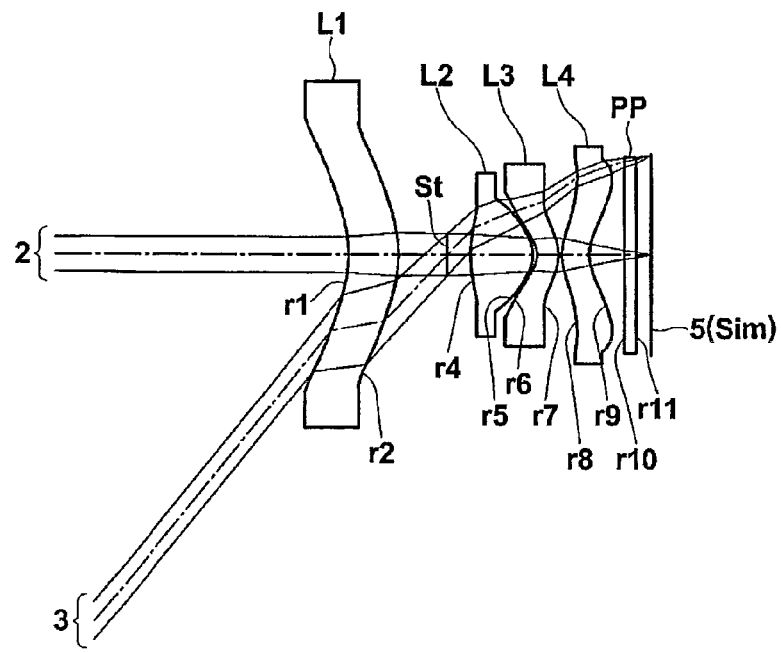
FIG. 5 is a cross-sectional view illustrating an optical path and the structure of an imaging lens according to Example 3 of the invention.
Figure 6:
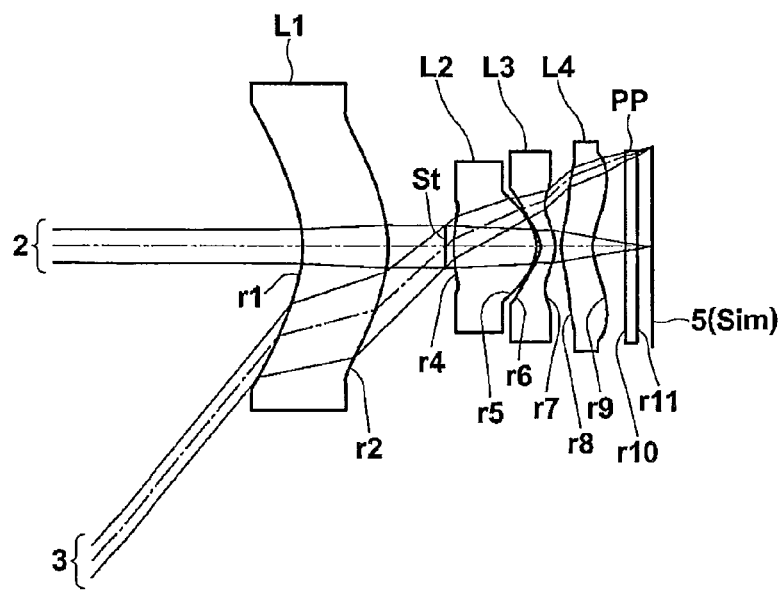
FIG. 6 is a cross-sectional view illustrating an optical path and the structure of an imaging lens according to Example 4 of the invention.

The second lens L2 of the imaging lens may be configured such that a normal line $H_{2f}$ of the object side-surface of the second lens L2 at a point where the outermost light beam 9 of the on-axis light flux 2 passes intersects the optical axis Z at a position closer to the object side than the object side-surface, as in the example shown in FIG. 2. FIG. 2 is an enlarged view illustrating a main part of the second lens L2 of an imaging lens according to Example 8, which will be described below. In FIG. 2, the light flux 3 at the maximum angle of view and an object-side light flux on the left side of a break line are not shown. In FIG. 2, the intersection point $P_{2f}$ between the normal line $H_{2f}$ and the optical axis Z is arranged closer to the object side than the object side-surface of the second lens L2. According to this structure, the object side-surface of the second lens L2 may have a concave shape at a point on the object side-surface of the second lens L2 where the outermost light beam of the on-axis light flux 2 passes and in the vicinity of the point, and the angle between each incident light beam and the normal line of the object side-surface may be reduced. Therefore, it is possible to prevent the light beam from being refracted to the optical axis at a large angle in the object side-surface, and it is easy to ensure a large image circle. When the object side-surface of the second lens L2 has a concave shape in the entire region from the paraxial region to the region in which the light flux 3 passes at the maximum angle of view, it is easier to ensure a large image circle.

When any one of the structure in which the second lens L2 has a biconvex shape in the paraxial region, the structure in which the second lens L2 has a biconvex shape in an effective diameter region, and the structure in which the normal line of the object side-surface of the second lens L2 at a point where the outermost light beam 9 of the on-axis light flux 2 passes intersects the optical axis Z at a position closer to the object side than the object side-surface is used, it is preferable that the Imaging lens satisfy the following Conditional expression 5:

$$0.0 \leq |Z4|/|Z5| < 0.5 \quad \text{[Conditional expression 5]}$$

In Conditional expression 5, as shown in FIG. 1B, the distance between a point on the object-side surface of the second lens L2 where the outermost light beam 7 of the light flux 3 at the maximum angle of view passes and a tangent plane to the top of the object-side surface of the second lens L2 in the optical axis direction is Z4, and the distance between a point on the image-side surface of the second lens L2 where the outermost light beam 7 of the light flux 3 at the maximum angle of view passes and a tangent plane to the top of the image-side surface of the second lens L2 in the optical axis direction is Z5. FIG. 1B is a partial enlarged view illustrating the aperture diaphragm St, the second lens L2, the third lens L3, the on-axis light flux 2, and the light flux 3 at the maximum angle of view in the imaging lens shown in FIG. 1A.

In the following description, for Z4, the sign of Z4 is negative when a point on the object side-surface of the second lens L2 where the outermost light beam 7 of the light flux 3 at the maximum angle of view passes is closer to the object side than the position of the tangent plane of the top of the object side-surface of the second lens L2, and the sign of Z4 is positive when the point on the object side-surface of the second lens L2 is closer to the image side than the position of the tangent plane. Similarly, for Z5, the sign of Z5 is negative when a point on the image side-surface of the second lens L2 where the outermost light beam 7 of the light flux 3 at the maximum angle of view passes is closer to the object side than the position of the tangent plane of the top of the image side-surface of the second lens L2, and the sign of Z5 is positive when the point on the image side-surface of the second lens L2 is closer to the image side than the position of the tangent plane.

It is preferable that the second lens L2 have a shape in which the absolute value of the curvature radius of the image-side surface is smaller than that of the curvature radius of the object-side surface in the paraxial region, in order to reduce the size of the lens and correct aberration. Conditional expression 5 relates to the shape of the second lens L2 and is for preventing deterioration of the comatic aberration of the marginal light flux and insufficient correction of spherical aberration.

When the distance Z4 is a positive value, |Z4| is large, and the angle between a light beam of a marginal light flux and the normal line of the object-side surface of the second lens L2 at the point where the light beam passes is too large, high-order comatic aberration occurs and high resolution is not obtained. When the distance Z4 is a negative value, |Z4| is large, and the angle between a light beam of the marginal light flux and the normal line of the object-side surface of the second lens L2 at the point where the light beam passes is too small, it is necessary to strongly refract the light beam to the optical axis in the image-side surface of the second lens L2 in order to prevent an increase in the size of the lens system. In this case, it is necessary to increase the angle between the light beam of the marginal light flux and the normal line of the image-side surface of the second lens L2 at the point where the light beam passes. When the angle increases, |Z5| is large and high-order comatic aberration occurs, which is not preferable. When the absolute value of the curvature radius of the image-side surface of the second lens L2 is reduced, a large negative spherical aberration occurs, which makes correction of aberration difficult. Therefore, it is possible to effectively correct aberration by maintaining the values of Z4 and Z5 in the range of Conditional expression 5.

When the second lens L2 has a biconvex shape and is configured so as to satisfy Conditional expression 5, it is possible to prevent the excessively strong focusing of light by the object side-surface of the second lens L2 and thus prevent the occurrence of high-order comatic aberration. Therefore, it is easy to obtain high resolution.

When the second lens L2 is configured such that the normal line of the object side-surface of the second lens L2 at a point where the outermost light beam 9 of the on-axis light flux 2 passes intersects the optical axis Z at a position closer to the object side than the object side-surface and Conditional expression 5 is satisfied, it is possible to diverge the on-axis light flux 2 in the object side-surface of the second lens L2. Therefore, it is possible to increase the distance between the lens system and the imaging device 5 and reduce mechanical restrictions in the shape of a barrel considering, for example, focusing. For the off-axis light flux, it is possible to relatively increase the angle between the light beam incident on the object side-surface of the second lens L2 and the normal line of the object side-surface of the second lens L2 at a point where the light beam passes. Therefore, it is possible to reduce the distance between the first lens L1 and the second lens L2 and increase the curvature radius of the first lens L1. As a result, it is possible to reduce the maximum thickness including the depth of the first lens L1 and thus reduce the total length of the lens system. The term "maximum thickness including the depth of the first lens L1" means the length from a point closest to the object side to a point closest to the image side on the first lens L1 in the optical axis direction and the length of a space required for accommodating the first lens L1 in the optical axis direction.

When the Abbe number of the third lens L3 with respect to the d-line is ν3, it is preferable that the imaging lens satisfy the following Conditional expression 6:

$$\nu 3 < 35 \qquad \text{[Conditional expression 6]}$$

Conditional expression 6 relates to a material forming the third lens L3 and particularly relates to the correction of chromatic aberration. If the Abbe number is more than the upper limit of Conditional expression 6, chromatic aberration is insufficiently corrected. For example, when the imaging lens is used in a wide wavelength range of visible light, it is difficult to obtain high resolution.

In the imaging lens, it is preferable that the image-side surface of the third lens L3 be an aspheric surface. Next, a preferred aspheric shape of the image-side surface of the third lens L3 will be described with reference to FIGS. 1C and 1D. FIGS. 1C and 1D show an example of the preferred aspect. However, the preferred aspect is not necessarily limited to that shown in FIGS. 1C and 1D, which will be described below. FIG. 1C shows the imaging lens, the on-axis light flux 2 from an object at a predetermined finite distance, the light flux 3 at the maximum angle of view, and a light flux 4 that is incident at half the maximum angle of view. FIG. 1D is a partial enlarged view illustrating the aperture diaphragm St, the second lens L2, and the third lens L3. For simplicity of illustration, FIG. 1D partially shows only the outermost light beam 7 of the light flux 3 at the maximum angle of view, the outermost light beam 8 of the light flux 4 at half the maximum angle of view, and the outermost light beam 6 of the on-axis light flux 2. The outermost light beams 6, 7, and 8 are in the image-side surface of the third lens L3.

As shown in FIG. 1D, the normal lines (represented by dotted lines) of the image-side surface of the third lens L3 at the points where the outermost light beam 7 of the light flux 3 at the maximum angle of view, the outermost light beam 8 of the light flux 4 at half the maximum angle of view, and the outermost light beam 6 of the on-axis light flux 2 pass are $H_7$, $H_8$, and $H_6$, respectively. In addition, the intersections of the normal lines $H_7$, $H_8$, and $H_6$ and the optical axis Z are $P_7$, $P_8$, and $P_6$, respectively. In FIG. 1C, the three normal lines are represented by dotted lines and the points $P_7$, $P_8$, and $P_6$ are shown. However, for simplicity of illustration, reference numerals indicating the normal lines are omitted in FIG. 1C.

In the imaging lens, it is preferable that the point $P_6$ where the normal line $H_6$ of the image-side surface of the third lens L3 at the point where the outermost light beam 6 of the on-axis light flux 2 passes intersects the optical axis Z be closer to the object side than the image-side surface of the third lens L3. It is preferable that the normal line $H_8$ of the image-side surface of the third lens L3 at the point where the outermost light beam 8 of the light flux 4 at half the maximum angle of view passes intersects the optical axis Z at a position closer to the object side than the point $P_6$, as shown as a point $P_8$ in FIGS. 1O and 1D, or be parallel to the optical axis Z, unlike the aspect shown in FIGS. 1C and 1D, or intersect the optical axis Z at a position closer to the image side than the image-side surface of the third lens L3. It is preferable that the shape of the image-side surface of the third lens L3 be determined so as to satisfy the above-mentioned aspects. As such, it is possible to refract light flux in a direction in which the light flux is separated from the optical axis Z by increasing the curvature radius of the convex shape out of the axis. Therefore, it is possible to ensure a large image circle. For example, when the imaging lens is applied to an image reading apparatus using an area sensor, a large image circle makes it possible to read a document image without increasing a conjugate length, which contributes to a reduction in the size of the apparatus.

When the longest distance between each point on the image-side aspheric surface of the third lens L3 and the tangent plane to the top of the image-side surface of the third lens L3 in the optical axis direction is $Z7m$, it is preferable that the imaging lens satisfy the following Conditional expression 7, in addition to the structure in which the image-side surface of the third lens L3 is an aspheric surface:

$-0.25 < Z7m/f < -0.03$            [Conditional expression 7]

However, for the sign of $Z7m$, the distance from the tangent plane to the top of the image-side surface of the third lens L3 to the object side is negative, and the distance from the tangent plane to the image side is positive.

FIG. 1D shows an example of $Z7m$. If the ratio is less than the lower limit of Conditional expression 7, the curvature radius of the convex image-side surface of the third lens L3 is insufficiently increased and it is difficult to separate the marginal light flux from the optical axis Z. Therefore, it is necessary to increase the distance between the third lens L3 and the fourth lens L4 or the distance between the lens system and the imaging device 5 in order to obtain a large image circle. As a result, it is difficult to obtain a wide angle of view and reduce the size of the imaging lens. If the ratio is more than the upper limit of Conditional expression 7, it is easy to ensure a large image circle, but the angle between the marginal ray and the normal line of the surface at the point where the light beam passes increases. As a result, high-order comatic aberration occurs and it is difficult to correct aberration.

In order to obtain a wide angle of view and reduce the size of the imaging lens by reducing the focal length of the entire system, it is necessary to refract the marginal light flux in the direction in which it is separated from the optical axis Z in the image-side surface of the third lens L3. In order to meet the requirements, it is preferable that the outermost light beam 7 of the light flux 3 at the maximum angle of view be configured as follows. When the point $P_8$ where the normal line $H_8$ and the optical axis Z intersect each other is closer to the object side than the point $P_6$, it is preferable that the normal line $H_7$ of the image-side surface of the third lens L3 at the point where the outermost light beam 7 of the light flux 3 at the maximum angle of view passes intersect the optical axis Z at a position closer to the image side than the image-side surface of the third lens L3, as shown as the point $P_7$ in FIGS. 1C and 1D, intersect the optical axis Z at a position closer to the object side than the point $P_8$, unlike the aspect shown in FIGS. 1C and 1D, or be parallel to the optical axis Z. When the normal line $H_8$ is parallel to the optical axis Z or intersects the optical axis Z at a position closer to the image side than the image-side surface of the third lens L3, it is preferable that the point $P_7$ where the normal line $H_7$ of the image-side surface of the third lens L3 at the point where the outermost light beam 7 of the light flux 3 at the maximum angle of view passes intersects the optical axis Z be closer to the image side than the image-side surface of the third lens L3. It is preferable to determine the shape of the image-side surface of the third lens L3 in this way. In this case, it is preferable that the imaging lens satisfy the following Conditional expression 7-1:

$-0.16 < Z7m/f < -0.03$           [Conditional expression 7-1]

In the imaging lens, as shown in FIG. 1A, it is preferable that a normal line $H_\gamma$ (represented by a dotted line) of the object-side surface of the fourth lens L4 at a point where the principal ray 9 of the light flux 3 at the maximum angle of view passes intersect the optical axis Z at a position closer to the image side than the object-side surface. When the angle between the normal line $H_\gamma$ of the object-side surface of the fourth lens L4 at the point where the principal ray 9 of the light flux 3 at the maximum angle of view passes and the optical axis is $\gamma$, it is more preferable that the imaging lens satisfy the following Conditional expression 8:

$0° < \gamma < 35°$            [Conditional expression 8]

In this case, it is considered that $\gamma$ is in the range of $-90° \leq \gamma \leq 90°$. The sign of is positive when the normal line $H_\gamma$ of the object-side surface of the fourth lens L4 at a point where the principal ray 6 of the light flux 3 at the maximum angle of view passes intersects the optical axis Z at a position closer to the image side than the object-side surface, and the sign of $\gamma$ is negative when the normal line $H_\gamma$ intersects the optical axis Z at a position closer to the object side than the object-side surface.

Conditional expression 8 is for controlling the incident angle of light on the imaging surface, that is, the angle between a light beam incident on the imaging surface and the normal line of the imaging surface when the imaging lens is provided in an apparatus and the imaging device is provided on the image surface Sim. In addition, Conditional expression 8 relates to telecentricity. When the incident angle of light on the imaging surface is too large, it is difficult to effectively ensure the quantity of light, which has an adverse effect on resolution or light distribution. Therefore, attention needs to be given to the incident angle.

Since the normal line $H_\gamma$ of the object-side surface of the fourth lens L4 at the point where the principal ray 9 of the light flux 3 at the maximum angle of view passes intersects the optical axis Z on the image side of the object-side surface, a portion of the object-side surface of the fourth lens L4 through which the principal ray 9 passes has a convex shape to control the incident angle of the light beam on the imaging surface. If the angle is less than the lower limit of Conditional expression 8, the incident angle of the light beam on the imaging surface is insufficiently corrected. Therefore, for example, it is necessary to increase the distance between the lens system and the imaging device. In this case, the focal length of the entire system increases and it is difficult to obtain a wide angle of view or reduce the size of the imaging lens, which is not preferable. If the angle is more than the upper limit of Conditional expression 8 and the angle between the normal line and the optical axis Z increases, high-order comatic aberration occurs due to the light flux passing through a peripheral portion of the lens, which makes it difficult to obtain high resolution.

In order to effectively correct comatic aberration so as to obtain high resolution, it is preferable that the imaging lens satisfy the following Conditional expression 8-1:

$$0° < \gamma < 25°$$ [Conditional expression 8-1]

When the normal line $H_\gamma$ of the object-side surface of the fourth lens L4 at a point where the principal ray 6 of the light flux 3 at the maximum angle of view passes intersects the optical axis Z at a position closer to the object side than the object-side surface, this structure is disadvantageous in telecentricity, but it is possible to reduce the maximum thickness including the depth of the fourth lens L4. Therefore, it is possible to reduce the total length of the lens system. However, when γ has a negative value and the absolute value thereof is too large, it is difficult for the image side-surface of the fourth lens L4 to sufficiently control the incident angle of light on the imaging surface using, and a peripheral portion of the image side-surface of the fourth lens L4 has a strong convex shape. Therefore, this structure is disadvantageous in ensuring an edge thickness or moldability. Therefore, when the normal line $H_\gamma$ of the object-side surface of the fourth lens L4 at a point where the principal ray 6 of the light flux 3 at the maximum angle of view passes intersects the optical axis Z at a position closer to the object side than the object-side surface, it is preferable that the imaging lens satisfy the following Conditional expression 8':

$$-10° < \gamma < 0°$$ [Conditional expression 8']

In the imaging lens, it is preferable that the aperture diaphragm St determining the F-number of the lens system, that is, the speed of the lens system be provided between the first lens L1 and the second lens L2. When the distance between the aperture diaphragm St and the second lens L2 on the optical axis is d3, it is preferable that the imaging lens satisfy the following Conditional expression 9:

$$0.0 \leq d3/f < 0.5$$ [Conditional expression 9]

Conditional expression 9 relates to the distance between the aperture diaphragm St and the second lens L2. If the ratio is more than the upper limit of Conditional expression 9, it is possible to reduce the incident angle of the light beam on the imaging surface, but the height of the light beam incident on an image-side lens group is increased by the aperture diaphragm St. As a result, the effective diameter of each lens increases, which makes it difficult to reduce the size of the imaging lens. When the total length of the lens system in the optical axis direction is reduced, the distance between the first lens L1 and the aperture diaphragm St is relatively short. In this case, it is necessary to increase the angle between the light flux incident on the aperture diaphragm St at the maximum angle of view and the optical axis Z. In order to increase the angle, the angle between each light beam and a normal line of the image-side surface of the first lens L1 needs to increase. In this case, high-order comatic aberration occurs and it is difficult to obtain high resolution.

In the imaging lens, it is preferable that at least one of the lenses of the entire system be made of a glass material.

When the imaging lens L1 is used as, for example, a monitoring lens in an environment in which it directly contacts air, it is preferable that the first lens L1 be made of a glass material. The glass material is less affected by humidity or ultraviolet rays and is less prone to damage than a plastic material. Therefore, the glass material has utility for these purposes.

The second lens L2 controls most of the focusing operation of the entire system and has a strong positive refractive power. Therefore, when the focal length is reduced and the angle of view increases, the absolute value of the curvature radius of the lens is too small, and high-order aberration is likely to occur. The plastic material has a relatively low refractive index. Therefore, when the second lens L2 is made of the plastic material, the above tendency is noticeable, which is not preferable. Therefore, it is useful to form the second lens L2 with a glass material capable of exhibiting a high refractive index in order to correct aberration.

When the third lens L3 is made of a glass material, the selectivity of a material with a small Abbe number increases, and the flexibility of the design for correcting chromatic aberration increases. Therefore, it is possible to provide a high-resolution lens. When the fourth lens L4 is made of a glass material, it is possible to use a material with a high refractive index, as compared to when a plastic material is used. Therefore, it is possible to reduce the angle between each light beam and the normal line of the surface at the point where each light beam passes and thus prevent the occurrence of high-order spherical aberration or comatic aberration.

In the imaging lens, the first lens L1 may have at least one aspheric surface and be made of a polyolefin-based plastic material. It is preferable that the first lens L1 have an aspheric surface in order to correct aberrations. When both surfaces of the first lens L1 are spherical surfaces, the absolute value of the curvature radius is small and high-order aberration is likely to occur. In addition, it is preferable that the first lens L1 be made of a plastic material which has fewer restrictions in molding conditions than glass, in terms of the flexibility of the design. As the plastic material, for example, polycarbonate or acryl may be used. In this case, it is possible to obtain a high performance in terms of the design, but the outside diameter and thickness of the first lens L1 increase. Therefore, it is preferable to select a material with small molding distortion, such as birefringence, and high weather resistance. When a plastic material is used, a polyolefin-based material may be selected in order to meet the above-mentioned requirements. For example, ZEONEX (registered trademark; manufactured by ZEON CORPORATION) may be given as an example of the polyolefin-based plastic material.

In the imaging lens, when a plurality of lenses arranged closer to the image side than the aperture diaphragm St is regarded as one lens group, it is preferable that the lens group include two or more lenses each having at least one aspheric surface. According to this structure, even though the absolute value of the curvature radius of the lens near the optical axis is decreased in order to reduce the focal length, it is possible to effectively prevent the occurrence of aberration, particularly, high-order aberration and thus obtain a high optical performance. The aspheric lens may be made of plastic. Plastic has advantages in that the molding conditions are less restricted than those of glass and it is cheaper than glass.

Next, an imaging lens according to a second embodiment of the invention will be described. The imaging lens shown in FIG. 1A is the structural example of the imaging lens according to the second embodiment of the invention. The imaging lens according to the second embodiment of the invention includes a first lens group G1 and a second lens group G2 arranged in this order from the object side. The first lens group G1 includes a first lens L1 with a meniscus shape having a concave surface facing the object side and the second lens group G2 includes two or more lenses each having at least one aspheric surface. For example, the second lens group G2 includes a second positive lens L2 that is arranged closest to the object side and a negative lens that is arranged closest to the image side.

Since the first lens group G1 arranged on the object side includes the first lens L1 with a meniscus lens having a concave surface facing the object side, it is possible to increase the angle between each light beam included in a light flux passing through, particularly, a peripheral portion of the object-side surface and a normal line of the object-side surface of the first lens L1 at a point where each light beam passes. Therefore, it is possible to obtain a wide angle of view. Since the first lens L1 has a meniscus shape, it is possible to cancel a positive field curvature occurring in the object-side concave surface with an image-side convex surface. As such, the first lens L1 has a shape suitable for obtaining a wide angle of view and correcting the image surface. When the angle of view increases, the object-side concave surface of the first lens L1 has strong power. When the first lens L1 has a meniscus shape and the image-side surface of the first lens L1 is formed in a convex shape and has strong power, it is possible to cancel a large positive field curvature occurring in the object-side concave surface having strong power with the image-side convex surface having strong power.

Since the positive lens is arranged closest to the object side of the second lens group G2, it is possible to reduce the focal length and thus reduce the size of the imaging lens. Since the negative lens is arranged closest to the image side of the second lens group G2, it is possible to slightly diverge the light flux emitted from the image side-surface of the negative lens and correct spherical aberration to the over side. Therefore, it is easy to increase the distance (so-called back focal length) from the lens surface arranged closest to the image side in the entire system to the image surface Sim, as compared to the structure the positive lens is provided.

Since the second lens group includes two or more aspheric lenses, it is possible to effectively prevent the occurrence of aberration, particularly, high-order aberration and thus obtain a high optical performance even though the absolute value of the curvature radius of the lens near the optical axis is decreased in order to reduce the focal length. The aspheric lenses included in the second lens group G2 may be made of a plastic material. Plastic has advantages in that the molding conditions are less restricted than those of glass and it is cheaper than glass.

When the distance between the first lens L1 and the second lens L2 on the optical axis is D and the focal length of the entire system is f, it is preferable that the imaging lens according to the second embodiment of the invention satisfy the following Conditional expression 1:

$$0.25 < D/f < 4.0 \quad \text{[Conditional expression 1]}$$

The operation and effect obtained when Conditional expression 1 is satisfied are the same as those of the first embodiment.

The imaging lens according to the second embodiment of the invention may have one or any combination of the preferred structures or the adopted structures of the imaging lens according to the first embodiment within the range in which the above-mentioned basic structure of this embodiment is consistent with that of the first embodiment.

For example, as shown in FIG. 1A, the second lens group G2 of the imaging lens according to the second embodiment of the invention may be configured so as to include a positive second lens L2, a third negative lens L3 with a meniscus shape having a convex surface facing the image side, and a fourth negative lens L4 which are arranged in this order from the object side. In order to reduce the size of the imaging lens and improve the resolution thereof, the second lens group G2 may include three lenses, that is, the second to fourth lenses L2 to L4.

When the second lens group G2 of the imaging lens according to the second embodiment of the invention includes the second to fourth lenses L2 to L4 in this order from the object side, the second lens group G2 may have one or any combination of the preferred structures or the adopted structures related to the second to fourth lenses L2 to L4 of the imaging lens according to the first embodiment.

When priority is given to reducing the size of the imaging lens, the second lens group G2 may include two positive lenses. When priority is given to improving the performance, the second lens group G2 may include four or more lenses.

Next, numerical examples of the imaging lens according to the invention will be described. FIGS. 3 to 12 are cross-sectional views illustrating imaging lenses according to Examples 1 to 10. In FIGS. 3 to 12, the left side is the object side, and the right side is the image side. FIGS. 3 to 11 also show the on-axis light flux 2 from an object at a predetermined finite distance, the light flux 3 at the maximum angle of view, and the optical member PP. FIGS. 3 to 12 do not necessarily show the shape or size of the aperture diaphragm St, but show the position of the aperture diaphragm St on the optical axis Z.

The lens data of an imaging lens according to Example 1 is shown in Table 1, the specification data thereof is shown in Table 2, and the aspheric data thereof is shown in Table 3. Similarly, the lens data, specification data, and aspheric data of imaging lenses according to Examples 2 to 10 are shown in Tables 4 to 30, respectively.

In the lens data shown in each table, an i-th (i=1, 2, 3, ...) surface number is written in the field of si. In this case, the surface of a lens closest to the object side is given number 1, and the surface number is sequentially increased toward the image side. The curvature radius of the i-th surface is written in the field of ri, and the surface spacing between the i-th surface and an (i+1)-th surface on the optical axis Z is written in a the field of d1. In addition, when a surface is convex to the object side, the curvature radius of the surface is positive. When a surface is convex to the image side, the curvature radius of the surface is negative.

In the lens data, the refractive index of a j-th (j=1, 2, 3, ...) optical component with respect to the e-line (wavelength: 546.1 nm) is written in the field of nej. In this case, an optical component arranged closest to the object side is given number 1, and the number is sequentially increased toward the image side. The Abbe number of the j-th optical component with respect to the d-line is written in the field of vdj. In addition, the lens data includes the aperture diaphragm St and the optical member PP, and the words (aperture diaphragm) are written after the surface number in the curvature radius field of a surface corresponding to the aperture diaphragm St.

In each table, the specification data includes the effective F-number, a magnification, the total angle of view, and the focal length. In all of the tables, the unit of length is "mm" and the unit of angle is "degree". However, these units are just illustrative, and other appropriate units may be used since the optical system can obtain the same optical performance during proportional enlargement or proportional reduction.

In the lens data shown in each table, the symbol '*' added to the surface number indicates an aspheric surface. The lens data includes the curvature radius of the aspheric surface near the optical axis (the curvature radius of the center). The aspheric data includes the surface number si of the aspheric surface, and an aspheric coefficient k and an n-order aspheric coefficient Bn (n=3, 4, 5, ..., 20) related to each aspheric surface. These aspheric coefficients are used to represent the aspheric shape of each aspheric surface using the following aspheric expression:

$$Zf(y) = \frac{c \cdot y^2}{[1 + (1 - K \cdot c^2 \cdot y^2)^{1/2}]} + \sum Bn \cdot |y|^n$$

(where Y indicates a height in a direction vertical to the optical axis Z, Zf(y) indicates the distance from a tangent plane to the top of an aspheric surface at a height y in the optical axis direction, and c indicates the curvature radius near the optical axis).

In the value of the aspheric coefficient in each table, "E−0m" (m is an integer) means "$\times 10^{-m}$", and "E+0m" (m is an integer) means "$\times 10^{m}$".

TABLE 1

Example 1 Lens data

| si | ri | di | nej | vdj |
|---|---|---|---|---|
| *1 | −2.906 | 2.369 | 1.5362 | 56.0 |
| *2 | −3.177 | 1.724 | | |
| 3 (Aperture diaphragm) | ∞ | 0.191 | | |

TABLE 1-continued

Example 1 Lens data

| si | ri | di | nej | vdj |
|---|---|---|---|---|
| *4 | 3.715 | 1.866 | 1.5362 | 56.0 |
| *5 | −1.020 | 0.161 | | |
| *6 | −0.533 | 0.496 | 1.6197 | 25.5 |
| *7 | −0.963 | 0.136 | | |
| *8 | 2.700 | 1.012 | 1.5362 | 56.0 |
| *9 | 2.332 | 0.466 | | |
| 10 | ∞ | 0.980 | 1.5182 | 64.1 |
| 11 | ∞ | 0.400 | | |
| 12 (Image surface) | ∞ | | | |

TABLE 2

Example 1 Specification data

| | |
|---|---|
| Effective F number | 2.90 |
| Magnification | 0.01554 |
| Total angle of view | 99.56 |
| Focal length | 2.647 |

TABLE 3

Example 1 Aspheric data

| | si | | | |
|---|---|---|---|---|
| | 1 | 2 | 4 | 5 |
| K | 4.440167E−01 | 1.761642E−02 | −7.922949E+00 | −1.666496E+00 |
| B3 | 4.374097E−03 | 7.417176E−03 | 2.138380E−02 | −1.721023E−03 |
| B4 | 2.082558E−02 | 1.405933E−02 | −9.369831E−02 | −6.553326E−02 |
| B5 | −3.740713E−03 | −3.106935E−03 | 1.973614E−01 | 2.438639E−02 |
| B6 | −2.047297E−03 | −3.356754E−03 | −5.917016E−02 | 3.344983E−02 |
| B7 | 6.297823E−04 | 1.806605E−03 | −2.894470E−01 | −1.419011E−02 |
| B8 | 1.898982E−04 | −1.187840E−04 | 6.371661E−02 | −3.726984E−02 |
| B9 | −9.738164E−05 | −9.563998E−05 | 3.932081E−01 | −5.516948E−02 |
| B10 | 1.120934E−05 | 1.714784E−05 | −2.431945E−01 | 5.459544E−02 |
| B11 | 0.000000E+00 | 0.000000E+00 | 0.000000E+00 | 0.000000E+00 |
| B12 | 0.000000E+00 | 0.000000E+00 | 0.000000E+00 | 0.000000E+00 |
| B13 | 0.000000E+00 | 0.000000E+00 | 0.000000E+00 | 0.000000E+00 |
| B14 | 0.000000E+00 | 0.000000E+00 | 0.000000E+00 | 0.000000E+00 |
| B15 | 0.000000E+00 | 0.000000E+00 | 0.000000E+00 | 0.000000E+00 |
| B16 | 0.000000E+00 | 0.000000E+00 | 0.000000E+00 | 0.000000E+00 |
| B17 | 0.000000E+00 | 0.000000E+00 | 0.000000E+00 | 0.000000E+00 |
| B18 | 0.000000E+00 | 0.000000E+00 | 0.000000E+00 | 0.000000E+00 |
| B19 | 0.000000E+00 | 0.000000E+00 | 0.000000E+00 | 0.000000E+00 |
| B20 | 0.000000E+00 | 0.000000E+00 | 0.000000E+00 | 0.000000E+00 |

| | si | | | |
|---|---|---|---|---|
| | 6 | 7 | 8 | 9 |
| K | −8.513334E−01 | −2.064245E+00 | −2.684989E+00 | −6.745465E+00 |
| B3 | 1.310734E−01 | 1.297239E−01 | 3.565119E−02 | −7.016623E−02 |
| B4 | −2.677839E−01 | −4.846101E−01 | −2.473844E−01 | 6.987221E−02 |
| B5 | 1.171004E+00 | 1.608233E+00 | 4.454533E−01 | −3.514078E−02 |
| B6 | −1.964801E+00 | −2.894153E+00 | −7.802235E−01 | −2.350114E−02 |
| B7 | 1.979829E+00 | 3.349725E+00 | 8.584581E−01 | 1.867939E−02 |
| B8 | −1.287951E+00 | −2.281206E+00 | −5.134313E−01 | 3.678741E−03 |
| B9 | 3.969310E−01 | 8.233119E−01 | 1.581859E−01 | −3.381829E−03 |
| B10 | −1.720727E−02 | −1.228772E−01 | −1.986559E−02 | 1.280555E−04 |
| B11 | 0.000000E+00 | 0.000000E+00 | −5.234309E−05 | −5.974397E−04 |
| B12 | 0.000000E+00 | 0.000000E+00 | 1.391244E−05 | 3.068517E−04 |
| B13 | 0.000000E+00 | 0.000000E+00 | 2.488355E−05 | −2.848771E−05 |
| B14 | 0.000000E+00 | 0.000000E+00 | −1.040772E−06 | 7.024265E−05 |
| B15 | 0.000000E+00 | 0.000000E+00 | 1.957723E−06 | −2.740078E−05 |
| B16 | 0.000000E+00 | 0.000000E+00 | −1.984393E−06 | −8.634792E−06 |
| B17 | 0.000000E+00 | 0.000000E+00 | −2.055124E−06 | 7.081806E−06 |
| B18 | 0.000000E+00 | 0.000000E+00 | −8.357583E−06 | −2.822986E−06 |
| B19 | 0.000000E+00 | 0.000000E+00 | 7.823607E−06 | 8.590844E−07 |
| B20 | 0.000000E+00 | 0.000000E+00 | −1.658252E−06 | −1.121968E−07 |

TABLE 4

Example 2 Lens data

| si | ri | di | nej | vdj |
|---|---|---|---|---|
| *1 | −3.116 | 2.497 | 1.5362 | 56.0 |
| *2 | −3.276 | 1.476 | | |
| 3 (Aperture diaphragm) | ∞ | 0.149 | | |
| *4 | 5.549 | 2.300 | 1.5362 | 56.0 |
| *5 | −0.705 | 0.089 | | |
| *6 | −0.467 | 0.351 | 1.6381 | 23.2 |
| *7 | −0.748 | 0.094 | | |
| *8 | 2.944 | 0.700 | 1.5362 | 56.0 |
| *9 | 1.198 | 1.027 | | |
| 10 | ∞ | 0.300 | 1.5182 | 64.1 |
| 11 | ∞ | 0.400 | | |

TABLE 4-continued

Example 2 Lens data

| si | ri | di | nej | vdj |
|---|---|---|---|---|
| 12 (Image surface) | ∞ | | | |

TABLE 5

Example 2 Specification data

| Effective F number | 2.79 |
|---|---|
| Magnification | 0.01500 |
| Total angle of view | 101.20 |
| Focal length | 2.553 |

TABLE 6

Example 2 Aspheric data

| | si | | | |
|---|---|---|---|---|
| | 1 | 2 | 4 | 5 |
| K | 3.918004E−01 | −2.289463E−01 | 3.364977E+01 | −3.382133E+00 |
| B3 | 6.285661E−03 | 9.739649E−03 | 5.108360E−02 | 1.204840E−01 |
| B4 | 1.966354E−02 | 1.523620E−02 | −2.917914E−01 | −2.685104E−01 |
| B5 | −3.602900E−03 | −4.187003E−03 | 4.529668E−01 | −2.639177E−02 |
| B6 | −2.080988E−03 | −3.426067E−03 | −1.013220E−01 | 5.987114E−02 |
| B7 | 6.162299E−04 | 1.886967E−03 | −4.905645E−01 | 2.435392E−02 |
| B8 | 1.933630E−04 | −1.152820E−04 | −2.741018E−02 | −9.674330E−03 |
| B9 | −9.744897E−05 | −9.707888E−05 | 5.646013E−01 | −3.595936E−02 |
| B10 | 1.088451E−05 | 1.801423E−05 | −7.111765E−01 | 4.605455E−02 |
| B11 | 4.305125E−08 | −1.569166E−07 | 2.837444E−01 | −1.082159E−03 |
| B12 | 8.780913E−09 | −1.664448E−07 | 1.367736E+00 | −1.358049E−02 |
| B13 | −1.018979E−09 | −5.353460E−08 | −3.459931E−02 | −7.470502E−03 |
| B14 | −1.005938E−09 | 2.625384E−08 | −1.470105E+00 | 6.700324E−03 |
| B15 | 0.000000E+00 | 0.000000E+00 | 0.000000E+00 | 0.000000E+00 |
| B16 | 0.000000E+00 | 0.000000E+00 | 0.000000E+00 | 0.000000E+00 |
| B17 | 0.000000E+00 | 0.000000E+00 | 0.000000E+00 | 0.000000E+00 |
| B18 | 0.000000E+00 | 0.000000E+00 | 0.000000E+00 | 0.000000E+00 |
| B19 | 0.000000E+00 | 0.000000E+00 | 0.000000E+00 | 0.000000E+00 |
| B20 | 0.000000E+00 | 0.000000E+00 | 0.000000E+00 | 0.000000E+00 |

| | si | | | |
|---|---|---|---|---|
| | 6 | 7 | 8 | 9 |
| K | −2.138252E+00 | −3.230202E+00 | −1.000011E+01 | −7.256099E−02 |
| B3 | 1.906354E−01 | 2.081562E−01 | 1.475497E−01 | −1.334787E−01 |
| B4 | −4.377522E−01 | −5.957247E−01 | −3.114749E−01 | −9.181204E−02 |
| B5 | 1.110148E+00 | 1.629386E+00 | 4.455308E−01 | 7.157041E−02 |
| B6 | −1.919723E+00 | −2.874384E+00 | −7.727758E−01 | −2.907846E−02 |
| B7 | 2.033499E+00 | 3.351828E+00 | 8.625222E−01 | 1.109579E−02 |
| B8 | −1.258810E+00 | −2.286318E+00 | −5.134029E−01 | 2.010223E−03 |
| B9 | 4.045234E−01 | 8.190361E−01 | 1.575955E−01 | −3.018698E−03 |
| B10 | −5.150894E−02 | −1.226978E−01 | −2.027040E−02 | 4.414414E−04 |
| B11 | 0.000000E+00 | 1.093076E−04 | −2.157256E−04 | −4.768385E−04 |
| B12 | 0.000000E+00 | 2.700370E−04 | −4.754865E−06 | 3.314526E−04 |
| B13 | 0.000000E+00 | 8.577017E−05 | 4.429574E−05 | −4.492814E−05 |
| B14 | 0.000000E+00 | 1.055193E−04 | 1.110386E−05 | 6.615712E−05 |
| B15 | 0.000000E+00 | −1.649584E−05 | 9.693166E−06 | −3.076384E−05 |
| B16 | 0.000000E+00 | −2.193369E−05 | 2.060412E−06 | −9.007137E−06 |
| B17 | 0.000000E+00 | −1.104703E−07 | −3.947550E−07 | 7.120269E−06 |
| B18 | 0.000000E+00 | 9.872884E−06 | −6.097012E−06 | −2.656497E−06 |
| B19 | 0.000000E+00 | 6.031608E−06 | 3.330207E−06 | 9.447924E−07 |
| B20 | 0.000000E+00 | −4.335315E−06 | −4.961011E−07 | −1.398644E−07 |

TABLE 7

Example 3 Lens data

| si | ri | di | nej | vdj |
|---|---|---|---|---|
| *1 | −3.076 | 1.297 | 1.8081 | 46.6 |
| *2 | −3.108 | 1.279 | | |
| 3 (Aperture diaphragm) | ∞ | 0.600 | | |
| *4 | 3.529 | 1.595 | 1.5362 | 56.0 |
| *5 | −0.706 | 0.105 | | |
| *6 | −0.524 | 0.560 | 1.8550 | 23.8 |
| *7 | −1.070 | 0.081 | | |
| *8 | 1.357 | 0.702 | 1.5362 | 56.0 |
| *9 | 1.098 | 0.896 | | |
| 10 | ∞ | 0.300 | 1.5182 | 64.1 |
| 11 | ∞ | 0.400 | | |
| 12 (Image surface) | ∞ | | | |

TABLE 8

Example 3 Specification data

| | |
|---|---|
| Effective F number | 2.72 |
| Magnification | 0.01500 |
| Total angle of view | 101.72 |
| Focal length | 2.551 |

TABLE 9

Example 3 Aspheric data

| | si | | | |
|---|---|---|---|---|
| | 1 | 2 | 4 | 5 |
| K | 4.023611E−01 | −1.150732E+00 | 7.333006E+00 | −4.157875E+00 |
| B3 | 6.515514E−03 | 4.487906E−03 | 3.576652E−02 | −5.500253E−02 |
| B4 | 1.940366E−02 | 1.546417E−02 | −1.952367E−01 | −8.022932E−02 |
| B5 | −3.750844E−03 | −4.112519E−03 | 2.862393E−01 | 1.535980E−04 |
| B6 | −2.049205E−03 | −3.532227E−03 | −9.141328E−02 | 2.489363E−02 |
| B7 | 6.342451E−04 | 1.867663E−04 | −3.753221E−01 | 8.501281E−03 |
| B8 | 1.961016E−04 | −1.137111E−04 | 1.382558E−01 | −6.799298E−03 |
| B9 | −9.791369E−05 | −9.387633E−05 | 7.175269E−01 | −3.519663E−02 |
| B10 | 1.062992E−05 | 1.869564E−05 | −7.016249E−01 | 4.387174E−02 |
| B11 | −5.459797E−08 | −1.878029E−07 | −4.993116E−02 | −2.228239E−03 |
| B12 | −1.189039E−08 | −2.190991E−07 | 1.654130E−01 | −9.531295E−03 |
| B13 | 3.326100E−10 | −6.935085E−08 | 8.674815E−02 | −7.889636E−03 |
| B14 | 3.501438E−09 | 2.875859E−08 | −6.808787E−02 | 5.857978E−03 |
| B15 | 0.000000E+00 | 0.000000E+00 | 0.000000E+00 | 0.000000E+00 |
| B16 | 0.000000E+00 | 0.000000E+00 | 0.000000E+00 | 0.000000E+00 |
| B17 | 0.000000E+00 | 0.000000E+00 | 0.000000E+00 | 0.000000E+00 |
| B18 | 0.000000E+00 | 0.000000E+00 | 0.000000E+00 | 0.000000E+00 |
| B19 | 0.000000E+00 | 0.000000E+00 | 0.000000E+00 | 0.000000E+00 |
| B20 | 0.000000E+00 | 0.000000E+00 | 0.000000E+00 | 0.000000E+00 |

| | si | | | |
|---|---|---|---|---|
| | 6 | 7 | 8 | 9 |
| K | −2.552472E+00 | −3.905066E+00 | −4.216663E+00 | −1.696644E+00 |
| B3 | −2.251600E−02 | 7.372289E−02 | 7.745489E−02 | 2.063397E−02 |
| B4 | −3.868244E−01 | −5.667327E−01 | −2.169783E−01 | −1.137505E−01 |
| B5 | 1.188770E+00 | 1.593437E+00 | 4.144734E−01 | 6.477051E−02 |
| B6 | −1.912875E+00 | −2.881075E+00 | −7.842109E−01 | −2.824968E−02 |
| B7 | 2.014050E+00 | 3.357531E+00 | 8.608800E−01 | 1.229271E−02 |
| B8 | −1.262641E+00 | −2.279496E+00 | −5.128579E−01 | 2.207477E−03 |
| B9 | 4.092488E−01 | 8.226709E−01 | 1.582304E−01 | −3.144311E−03 |
| B10 | −5.178931E−02 | −1.222019E−01 | −1.992750E−02 | 3.406526E−04 |
| B11 | 0.000000E+00 | −1.356333E−05 | −1.227937E−04 | −5.129692E−04 |
| B12 | 0.000000E+00 | −5.782159E−05 | 1.042292E−05 | 3.264965E−04 |
| B13 | 0.000000E+00 | −1.378932E−04 | 3.001079E−05 | −4.249934E−05 |
| B14 | 0.000000E+00 | 2.638972E−05 | −2.094183E−06 | 6.885887E−05 |
| B15 | 0.000000E+00 | −7.420946E−05 | 3.376326E−06 | −2.970756E−05 |
| B16 | 0.000000E+00 | −4.152517E−05 | 5.800035E−07 | −8.761259E−06 |
| B17 | 0.000000E+00 | 1.209091E−05 | −9.780357E−08 | 7.072636E−06 |
| B18 | 0.000000E+00 | 1.974608E−05 | −5.437220E−06 | −2.733851E−06 |
| B19 | 0.000000E+00 | 1.417138E−05 | 3.639254E−06 | 9.148677E−07 |
| B20 | 0.000000E+00 | −7.593927E−06 | −6.307744E−07 | −1.279907E−07 |

TABLE 10

Example 4 Lens data

| si | ri | di | nej | vdj |
|---|---|---|---|---|
| *1 | −2.952 | 2.226 | 1.5362 | 56.0 |
| *2 | −3.027 | 1.485 | | |
| 3 (Aperture diaphragm) | ∞ | 0.236 | | |
| *4 | 4.243 | 2.099 | 1.5362 | 56.0 |
| *5 | −0.993 | 0.110 | | |
| *6 | −0.559 | 0.381 | 1.6381 | 23.2 |
| *7 | −0.956 | 0.152 | | |
| *8 | 1.663 | 0.801 | 1.5362 | 56.0 |
| *9 | 1.329 | 0.828 | | |
| 10 | ∞ | 0.300 | 1.5182 | 64.1 |
| 11 | ∞ | 0.400 | | |
| 12 (Image surface) | ∞ | | | |

TABLE 11

Example 4 Specification data

| Effective F number | 2.80 |
|---|---|
| Magnification | 0.01500 |
| Total angle of view | 101.20 |
| Focal length | 2.553 |

TABLE 12

Example 4 Aspheric data

| | si | | | |
|---|---|---|---|---|
| | 1 | 2 | 4 | 5 |
| K | 3.840568E−01 | −2.236693E−01 | 1.576560E+00 | −2.681345E+00 |
| B3 | 7.044105E−03 | 1.112685E−02 | 4.189296E−02 | 2.259855E−02 |
| B4 | 1.994187E−02 | 1.466300E−02 | −2.102149E−01 | −1.183648E−01 |
| B5 | −3.745501E−03 | −3.888883E−03 | 3.647262E−01 | −3.077012E−02 |
| B6 | −2.079188E−03 | −3.458387E−03 | −1.144453E−01 | 2.880495E−02 |
| B7 | 6.256885E−04 | 1.874073E−04 | −4.294460E−01 | 1.939288E−02 |
| B8 | 1.951917E−04 | −1.159243E−04 | 1.047318E−01 | −1.684629E−03 |
| B9 | −9.741873E−05 | −9.614983E−05 | 7.624637E−01 | −3.520119E−02 |
| B10 | 1.083663E−05 | 1.815296E−05 | −6.329047E−01 | 4.042828E−02 |
| B11 | 2.475604E−08 | −1.864004E−08 | −1.358402E−02 | −4.402922E−03 |
| B12 | 5.392725E−09 | −1.398810E−07 | 1.402274E−01 | −1.000364E−02 |
| B13 | −2.698095E−10 | −3.941960E−08 | 1.222280E−02 | −6.541564E−03 |
| B14 | −7.435125E−10 | 1.807728E−08 | −4.298143E−02 | 6.392841E−03 |
| B15 | 0.000000E+00 | 0.000000E+00 | 0.000000E+00 | 0.000000E+00 |
| B16 | 0.000000E+00 | 0.000000E+00 | 0.000000E+00 | 0.000000E+00 |
| B17 | 0.000000E+00 | 0.000000E+00 | 0.000000E+00 | 0.000000E+00 |
| B18 | 0.000000E+00 | 0.000000E+00 | 0.000000E+00 | 0.000000E+00 |
| B19 | 0.000000E+00 | 0.000000E+00 | 0.000000E+00 | 0.000000E+00 |
| B20 | 0.000000E+00 | 0.000000E+00 | 0.000000E+00 | 0.000000E+00 |

| | si | | | |
|---|---|---|---|---|
| | 6 | 7 | 8 | 9 |
| K | −2.060145E+00 | −3.455089E+00 | −1.000033E+01 | −3.399024E+00 |
| B3 | −1.318573E−02 | 6.006044E−02 | 1.012667E−01 | 1.404018E−02 |
| B4 | −3.279693E−01 | −5.004457E−01 | −2.880685E−01 | −9.599669E−02 |
| B5 | 1.203598E+00 | 1.615166E+00 | 4.448964E−01 | 5.287959E−02 |
| B6 | −1.929173E+00 | −2.878474E+00 | −7.771315E−01 | −2.657041E−02 |
| B7 | 1.997461E+00 | 3.354718E+00 | 8.607730E−01 | 1.284859E−02 |
| B8 | −1.270147E+00 | −2.282438E+00 | −5.133448E−01 | 2.178587E−03 |
| B9 | 4.097273E−01 | 8.203712E−01 | 1.579827E−01 | −3.188768E−03 |
| B10 | −4.779404E−02 | −1.235049E−01 | −2.002080E−02 | 3.332204E−04 |
| B11 | 0.000000E+00 | −5.080244E−04 | −1.452991E−04 | −5.110881E−04 |
| B12 | 0.000000E+00 | −1.681226E−04 | 4.945940E−06 | 3.289239E−04 |
| B13 | 0.000000E+00 | −1.095394E−05 | 2.884983E−05 | −4.143046E−05 |
| B14 | 0.000000E+00 | 1.575902E−04 | −2.212056E−06 | 6.912070E−05 |
| B15 | 0.000000E+00 | 3.247325E−05 | 3.747707E−06 | −2.969008E−05 |
| B16 | 0.000000E+00 | 1.445240E−05 | 1.014696E−06 | −8.806944E−06 |
| B17 | 0.000000E+00 | 9.829729E−06 | 2.320936E−07 | 7.040364E−06 |
| B18 | 0.000000E+00 | 5.165074E−06 | −5.293549E−06 | −2.746728E−06 |
| B19 | 0.000000E+00 | 7.718066E−07 | 3.666368E−06 | 9.133963E−07 |
| B20 | 0.000000E+00 | −3.938481E−06 | −6.830472E−07 | −1.248254E−07 |

TABLE 13

Example 5 Lens data

| si | ri | di | nej | vdj |
|---|---|---|---|---|
| *1 | −2.781 | 2.482 | 1.5362 | 56.0 |
| *2 | −3.130 | 1.704 | | |
| 3 (Aperture diaphragm) | ∞ | 0.156 | | |
| *4 | 3.933 | 1.976 | 1.5362 | 56.0 |
| *5 | −1.092 | 0.222 | | |
| *6 | −0.586 | 0.484 | 1.6381 | 23.2 |
| *7 | −1.026 | 0.135 | | |
| *8 | 2.377 | 0.935 | 1.5362 | 56.0 |
| *9 | 2.039 | 0.794 | | |
| 10 | ∞ | 0.300 | 1.5182 | 64.1 |
| 11 | ∞ | 0.400 | | |

TABLE 13-continued

Example 5 Lens data

| si | ri | di | nej | vdj |
|---|---|---|---|---|
| 12 (Image surface) | ∞ | | | |

TABLE 14

Example 5 Specification data

| | |
|---|---|
| Effective F number | 2.80 |
| Magnification | 0.01500 |
| Total angle of view | 101.19 |
| Focal length | 2.556 |

TABLE 15

Example 5 Aspheric data

| | si | | | |
|---|---|---|---|---|
| | 1 | 2 | 4 | 5 |
| K | 3.722617E−01 | −4.721170E−02 | −2.249129E+00 | −3.414808E+00 |
| B3 | 8.330607E−03 | 1.185403E−02 | 2.886840E−02 | −2.702819E−02 |
| B4 | 2.067477E−02 | 1.398002E−02 | −1.786344E−01 | −8.989585E−02 |
| B5 | −3.792934E−03 | −3.493244E−03 | 3.693256E−01 | 1.709769E−03 |
| B6 | −2.081402E−03 | −3.400366E−03 | −1.446155E−01 | 4.344025E−02 |
| B7 | 6.298601E−04 | 1.870283E−03 | −4.879026E−01 | 1.535764E−02 |
| B8 | 1.965643E−04 | −1.212489E−04 | 1.241034E−01 | −1.832041E−02 |
| B9 | −9.737891E−05 | −9.825154E−05 | 8.628845E−01 | −5.167792E−02 |
| B10 | 1.076153E−05 | 1.756690E−05 | −6.022636E−01 | 3.509158E−02 |
| B11 | −1.596210E−08 | −1.855977E−07 | 0.000000E+00 | 0.000000E+00 |
| B12 | −2.535670E−09 | −8.275115E−08 | 0.000000E+00 | 0.000000E+00 |
| B13 | 2.728590E−10 | −1.105915E−08 | 0.000000E+00 | 0.000000E+00 |
| B14 | 4.770288E−10 | 1.525530E−08 | 0.000000E+00 | 0.000000E+00 |
| B15 | 0.000000E+00 | 0.000000E+00 | 0.000000E+00 | 0.000000E+00 |
| B16 | 0.000000E+00 | 0.000000E+00 | 0.000000E+00 | 0.000000E+00 |
| B17 | 0.000000E+00 | 0.000000E+00 | 0.000000E+00 | 0.000000E+00 |
| B18 | 0.000000E+00 | 0.000000E+00 | 0.000000E+00 | 0.000000E+00 |
| B19 | 0.000000E+00 | 0.000000E+00 | 0.000000E+00 | 0.000000E+00 |
| B20 | 0.000000E+00 | 0.000000E+00 | 0.000000E+00 | 0.000000E+00 |

| | si | | | |
|---|---|---|---|---|
| | 6 | 7 | 8 | 9 |
| K | −1.547463E+00 | −2.987364E+00 | −9.999190E+00 | −6.058412E+00 |
| B3 | 6.730206E−02 | 1.327301E−01 | 1.141964E−01 | −6.928831E−03 |
| B4 | −2.906693E−01 | −4.986090E−01 | −2.967290E−01 | −9.280527E−03 |
| B5 | 1.172980E+00 | 1.591812E+00 | 4.571674E−01 | −8.207325E−03 |
| B6 | −1.968475E+00 | −2.890152E+00 | −7.763909E−01 | −1.793268E−02 |
| B7 | 1.990218E+00 | 3.355880E+00 | 8.591491E−01 | 1.678602E−02 |
| B8 | −1.260857E+00 | −2.279880E+00 | −5.141016E−01 | 2.499983E−03 |
| B9 | 4.218693E−01 | 8.218509E−01 | 1.578083E−01 | −3.410506E−03 |
| B10 | −5.075147E−02 | −1.229354E−01 | −1.999472E−02 | 1.978461E−04 |
| B11 | 0.000000E+00 | −4.341145E−04 | −9.053558E−05 | −5.481527E−04 |
| B12 | 0.000000E+00 | −2.532490E−04 | 3.286252E−05 | 3.262284E−04 |
| B13 | 0.000000E+00 | −2.230867E−05 | 3.641302E−05 | −3.773548E−05 |
| B14 | 0.000000E+00 | 1.670046E−04 | −2.158604E−06 | 7.177765E−05 |
| B15 | 0.000000E+00 | 0.000000E+00 | 1.949284E−06 | −2.867823E−05 |
| B16 | 0.000000E+00 | 0.000000E+00 | 5.936153E−08 | −8.662795E−06 |
| B17 | 0.000000E+00 | 0.000000E+00 | −2.747016E−08 | 6.951045E−06 |
| B18 | 0.000000E+00 | 0.000000E+00 | −5.206633E−06 | −2.830732E−06 |
| B19 | 0.000000E+00 | 0.000000E+00 | 3.762956E−06 | 8.865090E−07 |
| B20 | 0.000000E+00 | 0.000000E+00 | −7.059128E−07 | −1.105240E−07 |

TABLE 16

Example 6 Lens data

| si | ri | di | nej | vdj |
|---|---|---|---|---|
| *1 | −3.075 | 4.668 | 1.7513 | 51.3 |
| *2 | −4.864 | 3.075 | | |
| 3 (Aperture diaphragm) | ∞ | 0.217 | | |
| *4 | 2.648 | 2.016 | 1.5362 | 56.0 |
| *5 | −0.803 | 0.129 | | |
| *6 | −0.572 | 0.519 | 1.7044 | 30.1 |
| *7 | −1.321 | 0.430 | | |
| *8 | −27.020 | 0.938 | 1.5182 | 64.1 |
| *9 | −46.130 | 0.894 | | |
| 10 | ∞ | 0.400 | 1.5182 | 64.1 |
| 11 | ∞ | 0.400 | | |
| 12 (Image surface) | ∞ | | | |

TABLE 17

Example 6 Specification data

| | |
|---|---|
| Effective F number | 2.80 |
| Magnification | 0.01400 |
| Total angle of view | 97.38 |
| Focal length | 2.403 |

TABLE 18

Example 6 Aspheric data

| | si | | | |
|---|---|---|---|---|
| | 1 | 2 | 4 | 5 |
| K | 4.072013E−01 | −8.241527E−01 | −1.109621E+01 | −3.828539E+00 |
| B3 | −6.256899E−03 | −6.010785E−03 | 2.994052E−02 | −1.145746E−02 |
| B4 | 2.275279E−02 | 1.382553E−02 | −9.492944E−02 | −1.170065E−01 |
| B5 | −3.573600E−03 | −2.849266E−03 | 3.131676E−01 | −1.103844E−02 |
| B6 | −2.121715E−03 | −3.218616E−03 | −8.342978E−02 | 5.108484E−02 |
| B7 | 6.133981E−04 | 1.820277E−03 | −4.362675E−01 | 2.255230E−02 |
| B8 | 1.959222E−04 | −1.329761E−04 | 9.042073E−02 | −1.603595E−02 |
| B9 | −9.646742E−05 | −1.004153E−04 | 5.095679E−01 | −5.512176E−02 |
| B10 | 1.061525E−05 | 1.847071E−05 | −2.972268E−01 | 3.926018E−02 |
| B11 | 0.000000E+00 | 0.000000E+00 | 0.000000E+00 | 0.000000E+00 |
| B12 | 0.000000E+00 | 0.000000E+00 | 0.000000E+00 | 0.000000E+00 |
| B13 | 0.000000E+00 | 0.000000E+00 | 0.000000E+00 | 0.000000E+00 |
| B14 | 0.000000E+00 | 0.000000E+00 | 0.000000E+00 | 0.000000E+00 |
| B15 | 0.000000E+00 | 0.000000E+00 | 0.000000E+00 | 0.000000E+00 |
| B16 | 0.000000E+00 | 0.000000E+00 | 0.000000E+00 | 0.000000E+00 |
| B17 | 0.000000E+00 | 0.000000E+00 | 0.000000E+00 | 0.000000E+00 |
| B18 | 0.000000E+00 | 0.000000E+00 | 0.000000E+00 | 0.000000E+00 |
| B19 | 0.000000E+00 | 0.000000E+00 | 0.000000E+00 | 0.000000E+00 |
| B20 | 0.000000E+00 | 0.000000E+00 | 0.000000E+00 | 0.000000E+00 |

| | si | | | |
|---|---|---|---|---|
| | 6 | 7 | 8 | 9 |
| K | −2.818784E+00 | −9.999992E+00 | −8.708997E−01 | 9.979470E+00 |
| B3 | 1.000903E−02 | 1.344201E−01 | 1.666073E−01 | −2.183113E−02 |
| B4 | −3.275668E−01 | −4.384493E−01 | −2.517568E−01 | 6.462004E−02 |
| B5 | 1.174677E+00 | 1.578922E+00 | 4.650537E−01 | −1.996564E−02 |
| B6 | −1.964016E+00 | −2.906657E+00 | −7.798428E−01 | −2.267401E−02 |
| B7 | 1.980307E+00 | 3.346478E+00 | 8.559483E−01 | 1.691858E−02 |
| B8 | −1.261127E+00 | −2.281176E+00 | −5.154996E−01 | 3.595051E−03 |
| B9 | 4.192352E−01 | 8.248573E−01 | 1.574815E−01 | −3.382901E−03 |
| B10 | −3.888273E−02 | −1.231578E−01 | −1.992115E−02 | 3.816572E−04 |
| B11 | 0.000000E+00 | 0.000000E+00 | 1.744436E−05 | −5.780295E−04 |
| B12 | 0.000000E+00 | 0.000000E+00 | 3.981265E−05 | 3.232424E−04 |
| B13 | 0.000000E+00 | 0.000000E+00 | 8.226618E−05 | −3.804948E−05 |
| B14 | 0.000000E+00 | 0.000000E+00 | 1.475188E−05 | 7.162711E−05 |
| B15 | 0.000000E+00 | 0.000000E+00 | 9.385781E−06 | −3.251939E−05 |
| B16 | 0.000000E+00 | 0.000000E+00 | −3.160878E−06 | −8.293458E−06 |
| B17 | 0.000000E+00 | 0.000000E+00 | −4.557744E−06 | 6.088109E−06 |
| B18 | 0.000000E+00 | 0.000000E+00 | −9.728757E−06 | −3.344277E−06 |
| B19 | 0.000000E+00 | 0.000000E+00 | 6.805558E−06 | 9.972540E−07 |
| B20 | 0.000000E+00 | 0.000000E+00 | −1.059342E−06 | −1.499954E−08 |

TABLE 19

Example 7 Lens data

| si | ri | di | nej | vdj |
|---|---|---|---|---|
| *1 | −3.247 | 2.771 | 1.5362 | 56.0 |
| *2 | −3.306 | 1.478 | | |
| 3 (Aperture diaphragm) | ∞ | 0.626 | | |
| *4 | 3.791 | 1.832 | 1.5182 | 64.1 |
| *5 | −1.167 | 0.119 | | |
| *6 | −0.668 | 0.352 | 1.9343 | 18.9 |
| *7 | −0.994 | 0.081 | | |
| *8 | 1.379 | 0.700 | 1.5362 | 56.0 |
| *9 | 1.109 | 1.034 | | |
| 10 | ∞ | 0.300 | 1.5182 | 64.1 |
| 11 | ∞ | 0.400 | | |
| 12 (Image surface) | ∞ | | | |

TABLE 20

Example 7 Specification data

| | |
|---|---|
| Effective F number | 2.71 |
| Magnification | 0.01480 |
| Total angle of view | 101.75 |
| Focal length | 2.523 |

TABLE 21

Example 7 Aspheric data

| | si | | | |
|---|---|---|---|---|
| | 1 | 2 | 4 | 5 |
| K | 3.892175E−01 | −4.577789E−01 | 7.025519E+00 | −1.193910E+01 |
| B3 | 1.624670E−03 | 6.021336E−03 | 4.565967E−02 | 3.415625E−02 |
| B4 | 1.926150E−02 | 1.750628E−02 | −2.188820E−01 | −1.732010E−01 |
| B5 | −3.021295E−03 | −4.763580E−03 | 3.624951E−01 | 1.133766E−02 |
| B6 | −2.046903E−03 | −3.317170E−03 | −1.844444E−01 | 5.046414E−02 |
| B7 | 5.940725E−04 | 1.917618E−03 | −3.593568E−01 | 6.397704E−03 |
| B8 | 1.875755E−04 | −1.241884E−04 | 2.251775E−01 | −1.674378E−02 |
| B9 | −9.805441E−05 | −1.016246E−04 | 7.504797E−01 | −3.344850E−02 |
| B10 | 1.113316E−05 | 1.757438E−05 | −8.219800E−01 | 5.004825E−02 |
| B11 | 1.111614E−07 | 2.092703E−07 | −2.366050E−01 | 2.556035E−03 |
| B12 | 1.831091E−08 | −1.389325E−07 | 6.767002E−01 | −1.323100E−02 |
| B13 | −5.583775E−10 | −1.241485E−07 | −2.963028E−01 | −9.161952E−03 |
| B14 | −2.309184E−09 | 5.319066E−08 | 3.093753E−02 | 6.410968E−03 |
| B15 | 0.000000E+00 | 0.000000E+00 | 0.000000E+00 | 0.000000E+00 |
| B16 | 0.000000E+00 | 0.000000E+00 | 0.000000E+00 | 0.000000E+00 |
| B17 | 0.000000E+00 | 0.000000E+00 | 0.000000E+00 | 0.000000E+00 |
| B18 | 0.000000E+00 | 0.000000E+00 | 0.000000E+00 | 0.000000E+00 |
| B19 | 0.000000E+00 | 0.000000E+00 | 0.000000E+00 | 0.000000E+00 |
| B20 | 0.000000E+00 | 0.000000E+00 | 0.000000E+00 | 0.000000E+00 |

| | si | | | |
|---|---|---|---|---|
| | 6 | 7 | 8 | 9 |
| K | −4.046246E+00 | −3.653983E+00 | −9.999877E+00 | −5.695972E−01 |
| B3 | 1.173659E−01 | 2.289359E−01 | 2.728133E−01 | −1.544536E−02 |
| B4 | −4.297102E−01 | −6.813352E−01 | −3.785190E−01 | −1.754940E−01 |
| B5 | 1.139279E+00 | 1.628943E+00 | 4.260817E−01 | 9.988103E−02 |
| B6 | −1.895705E+00 | −2.866646E+00 | −7.723317E−01 | −2.727887E−02 |
| B7 | 2.038801E+00 | 3.361366E+00 | 8.653963E−01 | 9.918190E−03 |
| B8 | −1.261999E+00 | −2.283213E+00 | −5.121469E−01 | 1.718917E−03 |
| B9 | 4.012017E−01 | 8.208606E−01 | 1.579240E−01 | −3.058149E−03 |
| B10 | −5.102848E−02 | −1.221959E−01 | −2.027681E−02 | 4.243912E−04 |
| B11 | 0.000000E+00 | −1.687586E−04 | −2.670469E−04 | −4.864542E−04 |
| B12 | 0.000000E+00 | −1.172487E−05 | −3.982193E−05 | 3.273821E−04 |
| B13 | 0.000000E+00 | −1.775743E−04 | 3.337636E−05 | −4.592601E−05 |
| B14 | 0.000000E+00 | −6.714290E−05 | 9.490089E−06 | 6.640027E−05 |
| B15 | 0.000000E+00 | −7.687593E−05 | 1.004637E−05 | −3.039940E−05 |
| B16 | 0.000000E+00 | −3.326522E−05 | 2.718409E−06 | −8.796722E−06 |
| B17 | 0.000000E+00 | 2.623364E−05 | −5.884374E−08 | 7.192505E−06 |
| B18 | 0.000000E+00 | 3.374665E−05 | −5.987887E−06 | −2.648895E−06 |
| B19 | 0.000000E+00 | 1.668709E−05 | 3.315589E−06 | 9.371893E−07 |
| B20 | 0.000000E+00 | −1.248660E−05 | −5.165636E−07 | −1.435903E−07 |

TABLE 22

Example 8 Lens data

| si | ri | di | nej | vdj |
|---|---|---|---|---|
| *1 | −3.5313 | 2.4439 | 1.53620 | 56.0 |
| *2 | −3.1424 | 1.1730 | | |
| 3 (Aperture diaphragm) | ∞ | 0.1696 | | |
| *4 | −164.4528 | 1.3210 | 1.59143 | 61.2 |
| *5 | −1.0499 | 0.2912 | | |
| *6 | −0.5649 | 0.3500 | 1.61963 | 25.5 |
| *7 | −0.9150 | 0.5826 | | |
| *8 | 2.6190 | 0.7012 | 1.53620 | 56.0 |
| *9 | 2.3177 | 0.7752 | | |
| 10 | ∞ | 0.5000 | 1.53620 | 64.1 |
| 11 | ∞ | 0.4000 | | |

TABLE 22-continued

Example 8 Lens data

| si | ri | di | nej | vdj |
|---|---|---|---|---|
| 12 (Image surface) | ∞ | | | |

TABLE 23

Example 8 Specification data

| | |
|---|---|
| Effective F number | 2.85 |
| Magnification | 0.01554 |
| Total angle of view | 96.03 |
| Focal length | 2.638 |

TABLE 24

Example 8 Aspheric data

| | si | | | |
|---|---|---|---|---|
| | 1 | 2 | 4 | 5 |
| K | 4.737754E−01 | −1.000002E+01 | −7.617723E+13 | −1.075269E+00 |
| B3 | 1.996021E−03 | −2.443466E−04 | −5.999691E−02 | 2.233925E−02 |
| B4 | 2.322596E−02 | 1.785237E−03 | 4.716981E−01 | −9.791910E−02 |
| B5 | −4.018721E−03 | −2.688907E−03 | −1.858526E+00 | 1.520998E−01 |
| B6 | −2.285436E−03 | −1.423138E−03 | 1.955361E+00 | −2.141222E−01 |
| B7 | 5.762322E−04 | 1.743522E−04 | 1.766745E+00 | 4.871524E−02 |
| B8 | 2.105668E−04 | −2.783039E−04 | −1.409681E+00 | 1.104789E−01 |
| B9 | −8.869777E−05 | −1.026610E−04 | −4.308107E+00 | −2.426076E−01 |
| B10 | 8.734796E−06 | 2.559589E−05 | −3.818764E+00 | 1.247576E−01 |
| B11 | 0.000000E+00 | 0.000000E+00 | 2.892067E+00 | 0.000000E+00 |
| B12 | 0.000000E+00 | 0.000000E+00 | 1.088148E+01 | 0.000000E+00 |
| B13 | 0.000000E+00 | 0.000000E+00 | 1.068003E+01 | 0.000000E+00 |
| B14 | 0.000000E+00 | 0.000000E+00 | −3.105903E+00 | 0.000000E+00 |
| B15 | 0.000000E+00 | 0.000000E+00 | −1.953890E+01 | 0.000000E+00 |
| B16 | 0.000000E+00 | 0.000000E+00 | −1.698886E+01 | 0.000000E+00 |
| B17 | 0.000000E+00 | 0.000000E+00 | 2.291448E+00 | 0.000000E+00 |
| B18 | 0.000000E+00 | 0.000000E+00 | 2.193995E+01 | 0.000000E+00 |
| B19 | 0.000000E+00 | 0.000000E+00 | 1.249985E+01 | 0.000000E+00 |
| B20 | 0.000000E+00 | 0.000000E+00 | −1.481236E+01 | 0.000000E+00 |

| | si | | | |
|---|---|---|---|---|
| | 6 | 7 | 8 | 9 |
| K | −1.623126E+00 | −2.672101E+00 | −9.905045E+00 | −5.828126E+00 |
| B3 | 1.617242E−01 | 1.840779E−01 | 1.405763E−01 | 7.260569E−02 |
| B4 | −4.776864E−01 | −4.373709E−01 | −2.806334E−01 | −1.206337E−01 |
| B5 | 1.367300E+00 | 1.538167E+00 | 4.291894E−01 | 4.080950E−02 |
| B6 | −1.922773E+00 | −2.921787E+00 | −7.836807E−01 | −1.973329E−02 |
| B7 | 1.805189E+00 | 3.359976E+00 | 8.588751E−01 | 1.289884E−02 |
| B8 | −1.344629E+00 | −2.277347E+00 | −5.119263E−01 | 2.132678E−03 |
| B9 | 5.562207E−01 | 8.208058E−01 | 1.587108E−01 | −3.288745E−03 |
| B10 | −7.328296E−02 | −1.211192E−01 | −1.996832E−02 | 2.945683E−04 |
| B11 | 0.000000E+00 | 0.000000E+00 | −1.732001E−04 | −5.379438E−04 |
| B12 | 0.000000E+00 | 0.000000E+00 | −1.983193E−05 | 3.187266E−04 |
| B13 | 0.000000E+00 | 0.000000E+00 | 2.503695E−05 | −2.799771E−05 |
| B14 | 0.000000E+00 | 0.000000E+00 | 1.574041E−05 | 6.921083E−05 |
| B15 | 0.000000E+00 | 0.000000E+00 | 9.045166E−06 | −2.810294E−05 |
| B16 | 0.000000E+00 | 0.000000E+00 | −6.731350E−07 | −8.873017E−06 |
| B17 | 0.000000E+00 | 0.000000E+00 | −3.206475E−06 | 7.004113E−06 |
| B18 | 0.000000E+00 | 0.000000E+00 | −9.533752E−06 | −2.841994E−06 |
| B19 | 0.000000E+00 | 0.000000E+00 | 7.347667E−06 | 8.531609E−07 |
| B20 | 0.000000E+00 | 0.000000E+00 | −1.336214E−06 | −1.011035E−07 |

TABLE 25

Example 9 Lens data

| si | ri | di | nej | vdj |
|---|---|---|---|---|
| *1 | −3.2311 | 2.5817 | 1.59143 | 61.2 |
| *2 | −3.1148 | 1.4245 | | |
| 3 (Aperture diaphragm) | ∞ | 0.1791 | | |
| *4 | −183.2825 | 1.1082 | 1.53620 | 56.0 |
| *5 | −0.9250 | 0.2954 | | |
| *6 | −0.6504 | 0.3500 | 1.85503 | 23.8 |
| *7 | −1.0258 | 0.7917 | | |
| *8 | 2.6583 | 0.6021 | 1.51169 | 56.2 |
| *9 | 2.3177 | 0.7839 | | |
| 10 | ∞ | 0.5000 | 1.51825 | 64.1 |
| 11 | ∞ | 0.4000 | | |
| 12 (Image surface) | ∞ | | | |

TABLE 26

Example 9 Specification data

| | |
|---|---|
| Effective F number | 2.87 |
| Magnification | 0.01554 |
| Total angle of view | 96.04 |
| Focal length | 2.639 |

TABLE 27

Example 9 Aspheric data

| | si | | | |
|---|---|---|---|---|
| | 1 | 2 | 4 | 5 |
| K | 3.018101E−01 | −9.999998E+00 | −7.617723E+13 | −1.441172E+00 |
| B3 | 1.743707E−03 | −4.293665E−03 | −3.580930E−02 | 4.864709E−03 |
| B4 | 2.318201E−02 | −1.571070E−03 | 2.885188E−01 | 9.229771E−03 |
| B5 | −3.753918E−03 | 9.500597E−04 | −1.434116E+00 | −2.104323E−02 |
| B6 | −2.400539E−03 | −1.946111E−03 | 1.642842E+00 | −3.408818E−01 |
| B7 | 5.557062E−04 | 1.322678E−03 | 1.109882E+00 | 2.907821E−01 |
| B8 | 2.183553E−04 | −2.340882E−04 | −1.268950E+00 | 2.168876E−01 |
| B9 | −8.608408E−05 | −3.150983E−05 | −2.628448E+00 | −5.952498E−01 |
| B10 | 8.031172E−06 | 9.311796E−06 | −3.161625E+00 | 2.928136E−01 |
| B11 | 0.000000E+00 | 0.000000E+00 | 8.355867E−01 | 0.000000E+00 |
| B12 | 0.000000E+00 | 0.000000E+00 | 9.689968E+00 | 0.000000E+00 |
| B13 | 0.000000E+00 | 0.000000E+00 | 8.115881E+00 | 0.000000E+00 |
| B14 | 0.000000E+00 | 0.000000E+00 | −2.111453E+00 | 0.000000E+00 |
| B15 | 0.000000E+00 | 0.000000E+00 | −1.511410E+01 | 0.000000E+00 |
| B16 | 0.000000E+00 | 0.000000E+00 | −1.142633E+01 | 0.000000E+00 |
| B17 | 0.000000E+00 | 0.000000E+00 | 6.282066E−01 | 0.000000E+00 |
| B18 | 0.000000E+00 | 0.000000E+00 | 1.322868E+01 | 0.000000E+00 |
| B19 | 0.000000E+00 | 0.000000E+00 | 1.293592E+01 | 0.000000E+00 |
| B20 | 0.000000E+00 | 0.000000E+00 | −1.182410E+01 | 0.000000E+00 |

| | si | | | |
|---|---|---|---|---|
| | 6 | 7 | 8 | 9 |
| K | −3.410142E+00 | −4.266750E+00 | −9.999972E+00 | −4.736268E+00 |
| B3 | −1.974407E−02 | 6.607188E−02 | 1.321502E−01 | 7.839502E−02 |
| B4 | −3.240367E−01 | −3.148628E−01 | −2.234975E−01 | −1.109372E−01 |
| B5 | 1.411721E+00 | 1.512643E+00 | 3.912904E−01 | 1.876554E−02 |
| B6 | −1.969225E+00 | −2.966809E+00 | −7.759655E−01 | −6.498446E−03 |
| B7 | 1.655277E+00 | 3.369652E+00 | 8.592035E−01 | 1.264692E−02 |
| B8 | −1.312493E+00 | −2.261248E+00 | −5.127647E−01 | 9.402731E−04 |
| B9 | 7.938530E−01 | 8.210934E−01 | 1.588926E−01 | −3.531950E−03 |
| B10 | −1.998173E−01 | −1.238456E−01 | −1.992062E−02 | 3.027912E−04 |
| B11 | 0.000000E+00 | 0.000000E+00 | −2.338205E−04 | −5.007398E−04 |
| B12 | 0.000000E+00 | 0.000000E+00 | −3.725136E−05 | 3.339900E−04 |
| B13 | 0.000000E+00 | 0.000000E+00 | 2.317699E−05 | −2.429267E−05 |
| B14 | 0.000000E+00 | 0.000000E+00 | 2.080237E−05 | 6.910716E−05 |
| B15 | 0.000000E+00 | 0.000000E+00 | 1.602082E−05 | −2.858907E−05 |
| B16 | 0.000000E+00 | 0.000000E+00 | 5.702290E−07 | −9.193989E−06 |
| B17 | 0.000000E+00 | 0.000000E+00 | −3.364059E−06 | 6.931178E−06 |
| B18 | 0.000000E+00 | 0.000000E+00 | −1.019781E−05 | −2.826734E−06 |
| B19 | 0.000000E+00 | 0.000000E+00 | 6.990544E−06 | 8.733435E−07 |
| B20 | 0.000000E+00 | 0.000000E+00 | −1.173022E−06 | −1.044778E−07 |

TABLE 28

Example 10 Lens data

| si | ri | di | nej | vdj |
|---|---|---|---|---|
| *1 | −2.9409 | 2.3000 | 1.536196 | 56.0 |
| *2 | −3.1193 | 1.8230 | | |
| 3 (Aperture diaphragm) | ∞ | 0.4550 | | |
| *4 | 4.8874 | 2.0000 | 1.536196 | 56.0 |
| *5 | −1.0793 | 0.2050 | | |
| *6 | −0.6193 | 0.5710 | 1.639963 | 23.6 |
| *7 | −1.1308 | 0.1200 | | |
| *8 | 1.9313 | 0.8250 | 1.536196 | 56.0 |
| *9 | 1.6359 | 1.0888 | | |
| 10 | ∞ | 0.3000 | 1.518249 | 64.1 |
| 11 | ∞ | 0.4000 | | |
| 12 (Image surface) | ∞ | | | |

TABLE 29

Example 10 Specification data

| | |
|---|---|
| Effective F number | 2.82 |
| Magnification | 0.01290 |
| Total angle of view | 96.04 |
| Focal length | 2.837 |

TABLE 30

Example 10 Aspheric data

| | si | | | |
|---|---|---|---|---|
| | 1 | 2 | 4 | 5 |
| K | 1.658090E−01 | −4.154486E+00 | −9.596776E+00 | −3.313897E+00 |
| B3 | 3.501706E−03 | 3.899028E−03 | 1.905172E−02 | −7.287702E−02 |
| B4 | 2.163356E−02 | 6.053755E−03 | −8.514112E−02 | −8.394994E−02 |
| B5 | −3.433094E−03 | −2.486339E−03 | 1.252702E−01 | −5.586020E−02 |
| B6 | −2.267658E−03 | −2.818817E−03 | −4.154168E−02 | 3.938804E−02 |
| B7 | 5.956104E−04 | 1.870771E−03 | −9.052918E−02 | 6.537800E−02 |
| B8 | 1.952671E−04 | −1.585833E−04 | 2.196958E−02 | 2.293967E−02 |
| B9 | −9.489460E−05 | −1.073571E−04 | 1.558503E−01 | −5.056287E−02 |
| B10 | 1.122799E−05 | 1.740141E−05 | −1.736644E−01 | 6.852954E−03 |
| B11 | −1.315287E−07 | 4.894183E−07 | 7.420701E−02 | −1.290873E−02 |
| B12 | −3.268720E−08 | 2.087947E−07 | −1.195223E−02 | 9.707457E−03 |
| B13 | −1.103914E−08 | 1.484776E−08 | 0.000000E+00 | 0.000000E+00 |
| B14 | 2.071763E−09 | −1.684640E−08 | 0.000000E+00 | 0.000000E+00 |
| B15 | 0.000000E+00 | 0.000000E+00 | 0.000000E+00 | 0.000000E+00 |
| B16 | 0.000000E+00 | 0.000000E+00 | 0.000000E+00 | 0.000000E+00 |
| B17 | 0.000000E+00 | 0.000000E+00 | 0.000000E+00 | 0.000000E+00 |
| B18 | 0.000000E+00 | 0.000000E+00 | 0.000000E+00 | 0.000000E+00 |
| B19 | 0.000000E+00 | 0.000000E+00 | 0.000000E+00 | 0.000000E+00 |
| B20 | 0.000000E+00 | 0.000000E+00 | 0.000000E+00 | 0.000000E+00 |

| | si | | | |
|---|---|---|---|---|
| | 6 | 7 | 8 | 9 |
| K | −1.885256E+00 | −5.375193E−01 | −1.000002E+01 | −6.585167E−01 |
| B3 | 4.112208E−02 | 2.559389E−01 | 2.327490E−01 | 2.373436E−02 |
| B4 | −5.440782E−01 | −5.505835E−01 | −5.191863E−01 | −2.777963E−01 |
| B5 | 1.211588E+00 | 1.549245E+00 | 6.519929E−01 | 2.155875E−01 |
| B6 | −1.869162E+00 | −2.909052E+00 | −8.303699E−01 | −6.011238E−02 |
| B7 | 2.017442E+00 | 3.361758E+00 | 8.479330E−01 | 1.628662E−03 |
| B8 | −1.253083E+00 | −2.271014E+00 | −5.168678E−01 | 3.713989E−03 |
| B9 | 4.180998E−01 | 8.263929E−01 | 1.599774E−01 | −2.415551E−03 |
| B10 | −7.608985E−02 | −1.237843E−01 | −1.923850E−02 | 6.566131E−04 |
| B11 | −6.665187E−03 | −1.604513E−03 | 3.992028E−04 | −5.511233E−04 |
| B12 | 5.467749E−03 | −4.377540E−04 | 7.013715E−05 | 3.355365E−04 |
| B13 | 4.001134E−03 | 1.730978E−04 | −5.794643E−05 | −4.825206E−05 |
| B14 | 1.502999E−03 | 2.035066E−04 | −1.531018E−05 | 6.898852E−05 |
| B15 | −2.060079E−03 | −3.784294E−05 | −2.362677E−05 | −3.197713E−05 |
| B16 | 2.512282E−04 | 8.360999E−06 | −6.014738E−06 | −9.771227E−06 |
| B17 | 0.000000E+00 | 0.000000E+00 | 4.141381E−06 | 7.185469E−06 |
| B18 | 0.000000E+00 | 0.000000E+00 | 4.520995E−06 | −2.523023E−06 |
| B19 | 0.000000E+00 | 0.000000E+00 | −1.792934E−06 | 9.823165E−07 |
| B20 | 0.000000E+00 | 0.000000E+00 | 1.206324E−07 | −1.603186E−07 |

Each of the imaging lenses according to Examples 1 to 10 includes four lenses. In the imaging lens according to Example 1, the four lenses each have aspheric surfaces on both sides and include a first lens L1, which a negative meniscus lens having a concave surface facing the object side in a paraxial region, a second lens L2, which is a biconvex lens in the paraxial region, a third lens L3, which is a negative meniscus lens having a convex surface facing the image side in the paraxial region, and a fourth lens L4, which is a negative meniscus lens having a convex surface facing the object side in the paraxial region.

In the imaging lenses according to Examples 2, 3, 4, 5, and 7, 10, the four lenses each have aspheric surfaces on both sides and the outline of the shape of the imaging lens is the same as that of the imaging lens according to Example 1. In the imaging lens according to Example 6, four lenses each have aspheric surfaces on both sides. The outline of the shape of the imaging lens according to Example 6 is the same as that of the imaging lens according to Example 1 except that the fourth lens L4 is a negative meniscus lens having a concave surface facing the object side in the paraxial region. In the imaging lenses according to Examples 8 and 9, four lenses each have aspheric surfaces on both sides. The outline of the shape of each of the imaging lenses according to Examples 8 and 9 is the same as that of the imaging lens according to Example 1 except that each of the first and second lenses L1 and L2 is a positive meniscus lens having a concave surface facing the object side in the paraxial region.

Figures 13I, 13J, 13K:
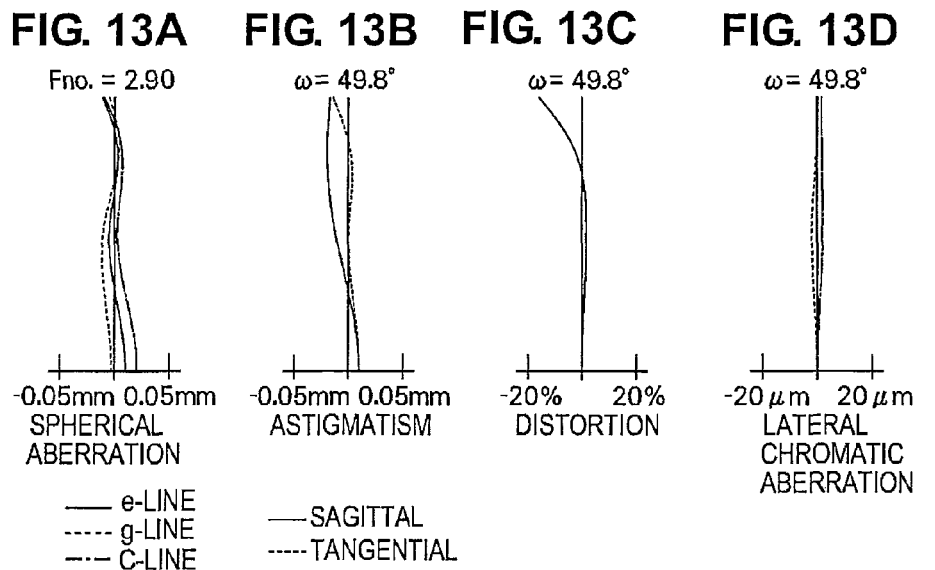
Figure 17A:
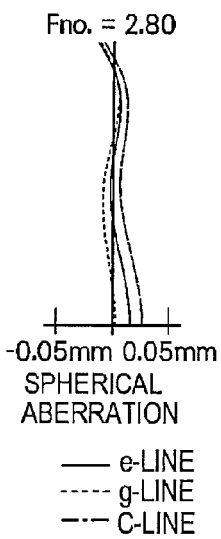
FIGS. 17A to 17K are diagrams illustrating the aberrations of the imaging lens according to Example 5 of the invention.
Figure 17B:
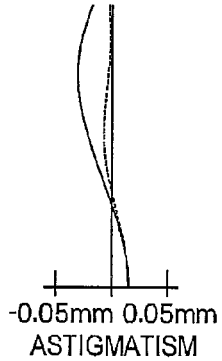
Figure 17C:
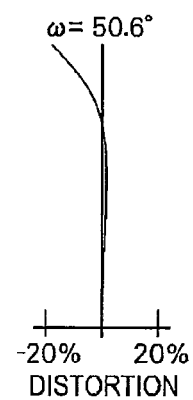
Figure 17D:
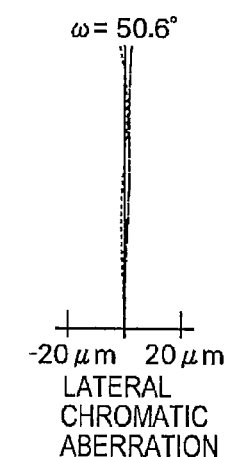
Figure 17E:
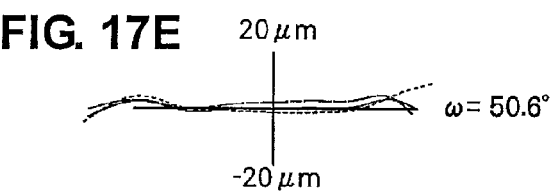
Figure 17I:
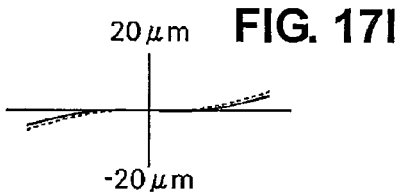
Figure 17F:
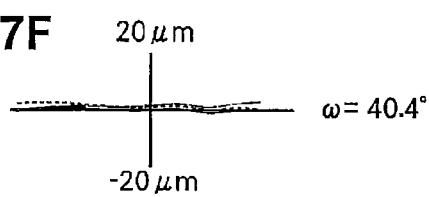
Figure 17J:
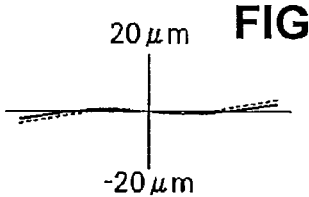
Figure 17G:
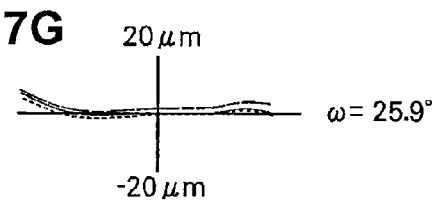
Figure 17K:
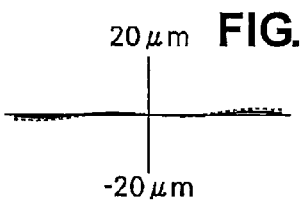
Figure 17H:
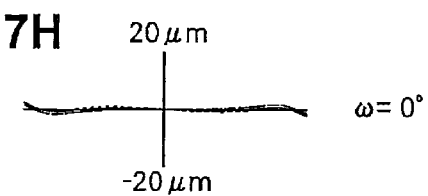
Figure 18A:
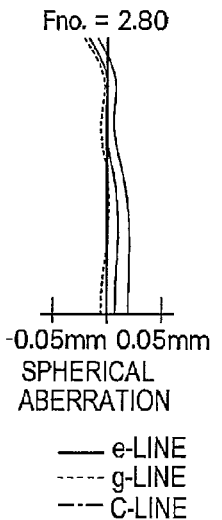
Figure 18B:
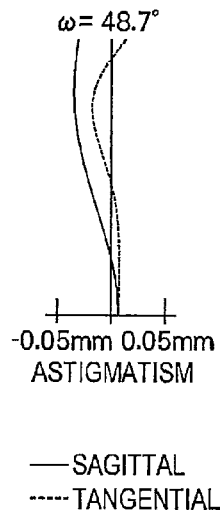
Figure 18C:
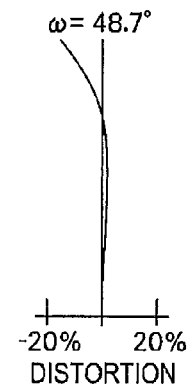
Figure 18D:
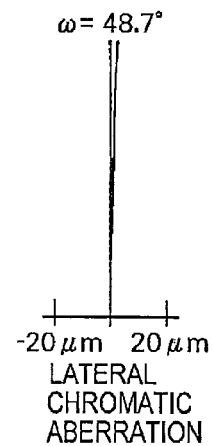
Figure 18H:
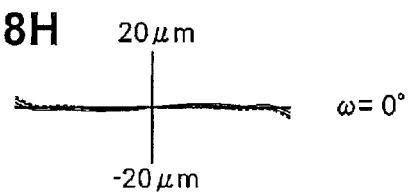

FIGS. 13A to 13K are aberration diagrams illustrating various aberrations of the imaging lens according to Example 1. FIGS. 13A to 13D show spherical aberration, astigmatism, distortion, and lateral chromatic aberration, respectively. FIGS. 13E to 13H show lateral aberration in the tangential direction at each angle of view and FIGS. 13I to 13K show lateral aberration in the sagittal direction at each angle of view. In each of the spherical aberration diagram, the lateral chromatic aberration diagram, and the lateral aberration diagram, aberration with respect to the e-line (546.1 nm) is represented by a solid line, aberration with respect to the g-line (wavelength: 435.8 nm) is represented by a dashed line, and aberration with respect to the C-line (wavelength: 656.3 nm) is represented by a one-dot chain line. The astigmatism diagram and the distortion diagram are for the e-line. In the astigmatism diagram, aberration in the sagittal direction is represented by a solid line and aberration in the tangential direction is represented by a dotted line. In the spherical aberration diagram, Fno. means the effective F-number. In the other aberration diagrams, ω means a half angle of view.

Similarly, FIGS. 14A to 14K, FIGS. 15A to 15K, FIGS. 16A to 16K, FIGS. 17A to 17K, FIGS. 18A to 18K, FIGS. 19A to 19K, FIGS. 20A to 20K, FIGS. 21A to 21K, and FIGS. 22A to 22K are aberration diagrams illustrating various aberrations of the imaging lenses according to Examples 2 to 10, respectively.

Table 31 shows values corresponding to Conditional expressions 1 to 10 of the imaging lenses according to Examples 1 to 9. The values shown in Table 31 are obtained when a reference wavelength is the e-line and a light flux is incident on the basis of the above-mentioned specification data.

TABLE 31

|  | Conditional expression | | | | | | | | |
|---|---|---|---|---|---|---|---|---|---|
|  | (1) D/f | (2) d1/D | (3) α | (4) α/β | (5) |Z4|/|Z5| | (6) ν3 | (7) Z7m/f | (8) γ | (9) d3/f |
| Example 1 | 0.72 | 1.24 | 75.5 | 1.25 | 0.12 | 25.5 | −0.093 | 10.8 | 0.07 |
| Example 2 | 0.64 | 1.54 | 73.1 | 1.22 | 0.05 | 23.2 | −0.095 | 23.7 | 0.06 |
| Example 3 | 0.74 | 0.69 | 72.2 | 1.09 | 0.17 | 23.8 | −0.152 | 1.5 | 0.24 |
| Example 4 | 0.67 | 1.29 | 74.6 | 1.21 | 0.10 | 23.2 | −0.106 | 11.4 | 0.09 |
| Example 5 | 0.73 | 1.33 | 75.5 | 1.29 | 0.11 | 23.2 | −0.086 | 17.1 | 0.06 |
| Example 6 | 1.37 | 1.42 | 75.0 | 1.69 | 0.26 | 30.1 | −0.038 | 23.6 | 0.09 |
| Example 7 | 0.83 | 1.32 | 73.1 | 1.25 | 0.32 | 18.9 | −0.095 | 12.4 | 0.25 |
| Example 8 | 0.51 | 1.82 | 65.27 | 1.08 | 0.03 | 25.5 | −0.084 | −2.2 | 0.06 |
| Example 9 | 0.61 | 1.61 | 68.29 | 1.11 | 0.06 | 23.8 | −0.077 | −0.6 | 0.07 |

As can be seen from the above-mentioned data, each of the imaging lenses according to Examples 1 to 10 has a small number of lenses, for example, four lenses and thus has a small size. In addition, each of the imaging lenses has a small effective F-number of 2.7 to 2.9 and a total angle of view of 85° to 102°, which is a sufficiently wide angle of view, effectively corrects each aberration, and has a high optical performance and high resolution.

The invention is not limited to the above-mentioned examples, but various modifications of the invention can be made. For example, the curvature radius, surface spacing, refractive index, and Abbe number of each lens component are not limited to the values described in the above-mentioned examples, but may have other values.

Figure 23:
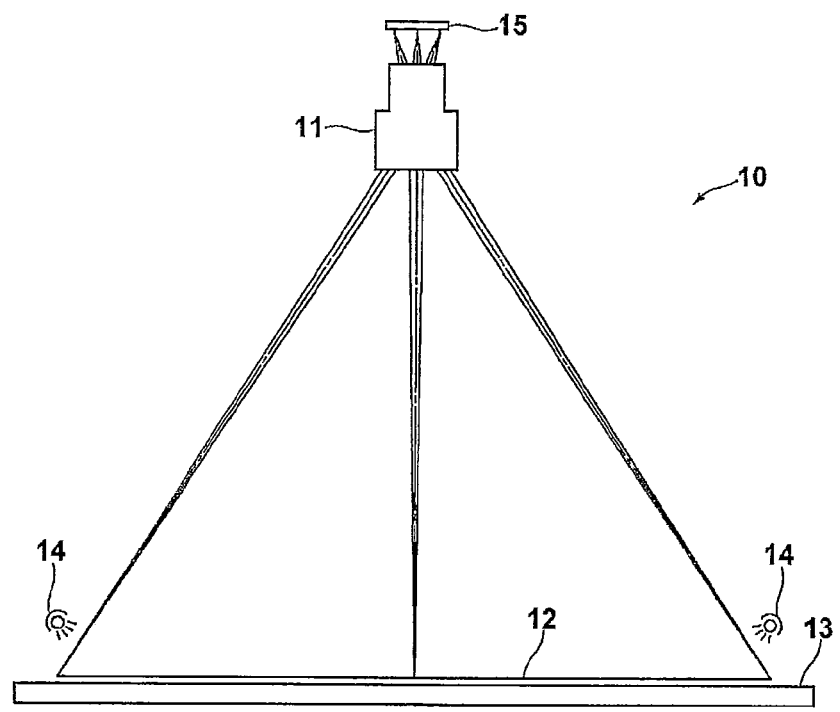
FIG. 23 is a diagram schematically illustrating the structure of an image reading apparatus according to an embodiment of the invention.

Next, an imaging apparatus according to an embodiment of the invention will be described. FIG. 23 is a diagram schematically illustrating the structure of the imaging apparatus according to an embodiment of the invention. An image reading apparatus 10 shown in FIG. 23 reads a document image and includes a reading lens 11, which is the imaging lens according to the above-described embodiment of the invention, a glass platen 13 on which a document 12 to be read is loaded, a light source 14 that emits illumination light to the document 12, and an imaging device 15 that captures the image of the document 12. However, in FIG. 23, the lens system of the reading lens 11 is schematically shown as one component.

The imaging device 15 converts an optical image formed by the reading lens 11 into electric signals and is, for example, a CCD or a CMOS (Complementary Metal Oxide Semiconductor). It is preferable that an optical element, such as a cover glass for protecting the imaging device, be provided between the reading lens 11 and the imaging device 15, if necessary. In addition, an optical element, such as a document pressing glass for pressing the document 12 against the glass platen 13 or a filter, may be provided between the reading lens 11 and the document 12, if necessary.

The image reading apparatus 10 is a reflective document reading apparatus. In the image reading apparatus 10, illumination light is emitted from the light source 14 to the document 12, and light reflected from the document 12 passes through the reading lens 11 and is then subjected to an image forming process. Then, the image of the document 12 is formed on the imaging device 15 and the imaging device 15 acquires the image as image information.

Figure 24:
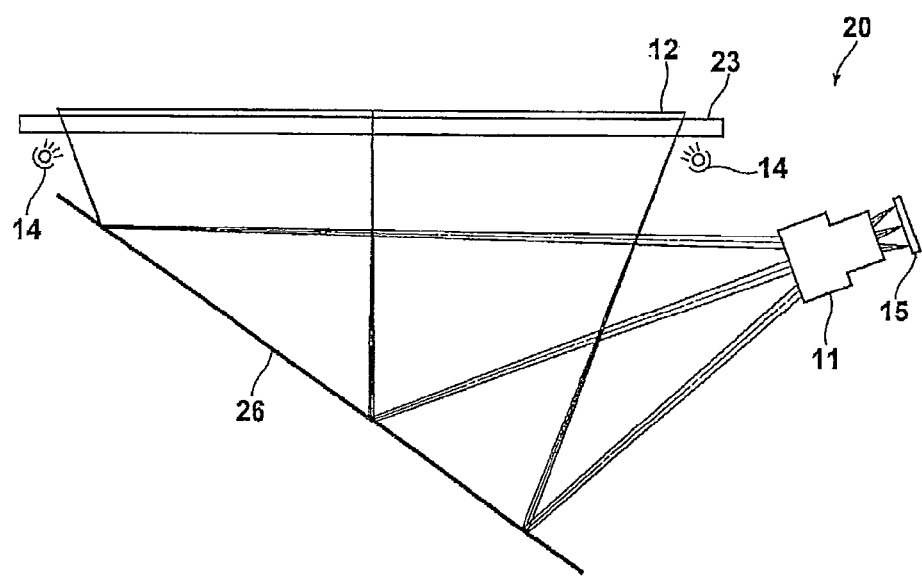
FIG. 24 is a diagram schematically illustrating the structure of an image reading apparatus according to another embodiment of the invention.

FIG. 24 is a diagram schematically illustrating the structure of an image reading apparatus 20 according to another embodiment of the invention. The image reading apparatus 20 is also a reflective document reading apparatus and is different from the image reading apparatus 10 shown in FIG. 23 in that a mirror 26 is provided between the document 12 and the reading lens 11 to deflect an optical path, which makes it possible to reduce the size of the apparatus. In the image reading apparatus 20, light reflected from the document 12 is incident on the reading lens 11 through the glass platen 23. Therefore, the glass platen 23 is made of a transparent material transmitting light. However, in FIG. 24, the lens system of the reading lens 11 is schematically shown as one component.

Although the embodiments of the invention have been described above, the invention is not limited thereto, but various modifications of the invention can be made. In the above-described embodiment, the reflective-document-type image reading apparatus is provided, but the invention is not limited thereto. For example, the invention may be applied to a transmissive-document-type image reading apparatus that reads an image document such as a negative film or a positive film. The transmissive-document-type image reading apparatus may be formed by arranging the light source 14 on the document side in the image reading apparatus 20 shown in FIG. 24 such that light emitted from the light source 14 is incident on the reading lens 11 through the document 12 and the glass platen 23 and the reading lens 11 forms the image of the document 12 on the imaging device 15. FIGS. 23 and 24 show an example in which an area sensor is used as the imaging device 15, but the invention is not limited thereto. A line sensor may be used as the imaging device and the imaging lens according to the invention may be used as a scanning lens.

The imaging lens according to the invention may be applied to other optical systems as well as the image reading optical system. The usage of the imaging lens is not limited to the optical system handling an object at a finite distance, but the imaging lens may be applied to an optical system handling an object at an infinite distance. In addition, the usage of the imaging lens is not limited to the optical system for visible light, but the imaging lens may be applied to an optical system for infrared light.

Specifically, for example, the imaging lens according to the invention may be applied to a monitoring camera, an in-vehicle camera, or a camera for authentication. When the imaging lens is applied to, for example, the monitoring camera, in some cases, a light beam is incident on the lens system at an angle more than the angle of view defined by the design specification. Therefore, it is preferable to provide an aperture diaphragm on the object side of the lens system or between the lenses in order to prevent stray light or shield extra light beams.

In the imaging apparatus to which the imaging lens is applied, various kinds of filters, such as an infrared cut filter, a visible light cut filter, and a filter coated with a water repellent material or a hydrophilic material, may be provided on the object side or the image side of the lens system. Alternatively, films having the same effects as various kinds of filters may be coated on the lens surfaces of some of the lenses included in the imaging lens.

What is claimed is:

1. An imaging lens comprising:
a plurality of lenses including no more than four lenses, wherein said no more than four lenses are
a first lens with a meniscus shape having a concave surface facing an object side;
a second positive lens;
a third negative lens with a meniscus shape having a convex surface facing an image side; and
a fourth negative lens,
wherein the first to fourth lenses are arranged in this order from the object side, and
a normal line of an object-side surface of the fourth lens at a point where the outermost light beam of an on-axis light flux passes intersects the optical axis on the image side of the object-side surface.

2. The imaging lens according to claim 1, wherein a normal line of an object-side surface of the second lens at a point where the outermost light beam of the on-axis light flux passes intersects the optical axis at a position that is closer to the object side than the object-side surface.

3. The imaging lens according to claim 1, wherein the imaging, lens satisfies the following conditional expression;

$$0.25 < D/f < 4.0$$

where D indicates a distance between the first lens and the second lens on the optical axis and f indicates the focal length of the entire system.

4. The imaging lens according to claim 1, wherein the imaging lens satisfies the following conditional expression:

$$0.5 < d1/D < 4.0$$

where d1 indicates the thickness of the center of the first lens and D indicates a distance between the first lens and the second lens on the optical axis.

5. The imaging lens according to claim 1, wherein the imaging lens satisfies the following conditional expression:

$$\alpha > 50°$$

where $\alpha$ indicates the angle between a principal ray of a light flux that is incident on an object-side surface of the first lens at a maximum angle of view and a normal line of the object-side surface of the first lens at a point where the principal ray passes.

6. The imaging lens according to claim 1, wherein the imaging lens satisfies the following conditional expression:

$$0.8 < \alpha/\beta < 3.0$$

where $\alpha$ indicates the angle between a principal ray of a light flux that is incident on an object-side surface of the first lens at a maximum angle of view and a normal line of the object-side surface of the first lens at a point where the principal ray passes and $\beta$ indicates the angle between it principal ray of a light flux that is emitted from an image-side surface of the first lens at the maximum angle of view and a normal line of the image-side surface of the first lens at a point where the principal ray passes.

7. The imaging lens according to claim 1,
wherein the second lens L2 has a biconvex shape, and
the imaging lens satisfies the following conditional expression:

$$0.0 \leq |Z4|/|Z5| < 0.5$$

where Z4 indicates the distance between a point on an object-side surface of the second lens where the outermost light beam of a light flux at the maximum angle of view passes and a tangent plane to the top of the object-side surface of the second lens in the optical axis direction, and Z5 indicates the distance between a point on an image-side surface of the second lens where the outermost light beam of the light flux at the maximum angle of view passes and to tangent plane to the top of the image-side surface of the second lens in the optical axis direction.

8. The imaging lens according to claim 1,
wherein a normal line of an object-side surface of the second lens at a point where the outermost light beam of the on-axis light flux passes intersects the optical axis at a position that is closer to the object side than the object-side surface, and
the imaging lens satisfies the following conditional expression:

$$0.0 \leq |Z4|/|Z5| < 0.5$$

where Z4 indicates the distance between a point on the object-side surface of the second lens where the outermost light beam of the light flux at the maximum angle of view passes and a tangent plane to the top of the object-side surface of the second lens in the optical axis direction, and Z5 indicates the distance between a point on an image-side surface of the second lens where the outermost light beam of the light flax, at the maximum angle of view passes and a tangent plane to the top of the image-side surface of the second lens in the optical axis direction.

9. The imaging lens according to claim 1,
wherein the imaging lens satisfies the following conditional expression:

$$v3 < 35$$

where v3 indicates the Abbe number of the third lens with respect to the d-line.

10. The imaging lens according to claim 1,
wherein an image-side surface of the third lens is an aspheric surface,
a normal line of the image-side surface of the third lens at a point where the outermost light beam of the on-axis light flux passes intersects the optical axis at a first point that is closer to the object side than the image-side surface,
a normal line of the image-side surface of the third lens at a point where the outermost light beam of a light flux at half the maximum angle of view passes intersects the optical axis at a second point that is closer to the object side than the first point, is parallel to the optical axis, or intersects the optical axis at a third point that is closer to the image side than the image-side surface of the third lens,
when the normal line of the image-side surface of the third lens at the point, where the outermost light beam of the light flux at half the maximum angle of view passes intersects the optical axis at the second point, a normal line of the image-side surface of the third lens at a point where the outermost light beam of the light flux at the maximum angle of view passes intersects the optical axis at a position that is closer to the object side than the second point, is parallel to the optical taxis, or intersects the optical axis at a position that is closer to the image side than the image-side surface of the third lens,
when the normal line of the image-side surface of the third lens at the point where the outermost light beam of the light flux at half the maximum angle of view passes is parallel to the optical axis or intersects the optical axis at the third point, the normal line of the image-side surface of the third lens at the point where the outermost light beam of the light flux at the maximum angle of view passes intersects the optical axis at a position that is closer to the image side than the image-side surface, and
the imaging, lens satisfies the following conditional expression:

$$-0.25 < Z7m/f < -0.03$$

where Z7m indicates the longest distance between each point on the image-side aspheric surface of the third lens and a tangent plate to the top of the image-side surface of the third lens in the optical axis direction and f indicates the focal, length of the entire system.

11. The imaging lens according, to claim 1,
wherein a normal line of the object-side surface of the fourth lens at a point where a principal ray of a light flux at a maximum angle of view passes intersects the optical axis at a position that is closer to the image side than the object-side surface, and
the imaging lens satisfies the following conditional expression:

$$0° < \gamma < 35°$$

where γ indicates the angle between the optical axis and the normal line of the object-side surface of the fourth lens at the point where the principal ray of the light flux at the maximum angle of view passes.

12. The imaging lens according to claim 1,
wherein at least one lens is made of a glass material.

13. The imaging lens according to claim 1,
wherein the object-side surface of the fourth lens is a convex surface.

14. The imaging lens according to claim 1, further comprising:
an aperture diaphragm that is provided between the first lens and the second lens, and
the imaging lens satisfies the following conditional expression;

$$0.0 \leq d3/f < 0.5$$

where d3 indicates the distance between the aperture diaphragm and the second lens on the optical axis and f indicates the focal length of the entire system.

15. The imaging lens according to claim 1,
wherein the first lens has at least one aspheric surface and is made of a polyolefin-based plastic material.

16. An imaging apparatus comprising:
the imaging lens according to claim 1.

* * * * *